(12) United States Patent
Li et al.

(10) Patent No.: US 12,260,615 B2
(45) Date of Patent: Mar. 25, 2025

(54) IMAGE ATTACK DETECTION METHOD AND APPARATUS, AND IMAGE ATTACK DETECTION MODEL TRAINING METHOD AND APPARATUS

(71) Applicant: TENCENT TECHNOLOGY (SHENZHEN) COMPANY LIMITED, Guangdong (CN)

(72) Inventors: Bo Li, Guangdong (CN); Jianghe Xu, Guangdong (CN); Shuang Wu, Guangdong (CN); Shouhong Ding, Guangdong (CN); Jilin Li, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 366 days.

(21) Appl. No.: 18/072,272

(22) Filed: Nov. 30, 2022

(65) Prior Publication Data

US 2023/0104345 A1 Apr. 6, 2023

Related U.S. Application Data

(63) Continuation of application No. PCT/CN2022/086735, filed on Apr. 14, 2022.

(30) Foreign Application Priority Data

Apr. 21, 2021 (CN) .......................... 202110431153.1

(51) Int. Cl.
*G06V 10/764* (2022.01)
*G06F 21/56* (2013.01)
(Continued)

(52) U.S. Cl.
CPC .......... *G06V 10/764* (2022.01); *G06F 21/566* (2013.01); *G06V 10/44* (2022.01);
(Continued)

(58) Field of Classification Search
CPC .... G06V 10/764; G06V 10/44; G06V 10/761; G06V 10/774; G06V 10/776;
(Continued)

(56) References Cited

U.S. PATENT DOCUMENTS

2019/0132354 A1 5/2019 Akiba

FOREIGN PATENT DOCUMENTS

| CN | 109784186 A | * | 5/2019 | ............ G06N 3/045 |
| CN | 109858368 A | | 6/2019 | |
| CN | 113762249 A | | 12/2021 | |

OTHER PUBLICATIONS

International Search Report for PCT/CN2022/086735 dated, Jun. 16, 2022 (PCT/ISA/210).
(Continued)

*Primary Examiner* — Andrae S Allison
*Assistant Examiner* — Phuong Hau Cai
(74) *Attorney, Agent, or Firm* — Sughrue Mion, PLLC

(57) ABSTRACT

An image attack detection method includes: acquiring an image-to-be-detected, and performing global classification recognition based on the image-to-be-detected to obtain a global classification recognition result; performing local image extraction randomly based on the image-to-be-detected to obtain a target number of local images, the target number being obtained by calculation according to a defensive rate of a reference image corresponding to the image-to-be-detected; performing local classification recognition based on the target number of local images respectively to obtain respective local classification recognition results, and fusing the respective local classification recognition results
(Continued)

to obtain a target classification recognition result; and detecting a similarity between the target classification recognition result and the global recognition result, and determining the image-to-be-detected as an attack image when the target classification recognition result and the global classification recognition result are dissimilar.

20 Claims, 13 Drawing Sheets

(51) Int. Cl.
*G06V 10/44* (2022.01)
*G06V 10/74* (2022.01)
*G06V 10/774* (2022.01)
*G06V 10/776* (2022.01)
*G06V 10/80* (2022.01)

(52) U.S. Cl.
CPC .......... *G06V 10/761* (2022.01); *G06V 10/774* (2022.01); *G06V 10/776* (2022.01); *G06V 10/809* (2022.01); *G06F 2221/034* (2013.01)

(58) Field of Classification Search
CPC ................ G06V 10/809; G06F 21/566; G06F 2221/034; G06F 21/55; G06F 18/24; G06F 18/253; G06F 18/214; G06N 3/045; G06N 3/08
See application file for complete search history.

(56) References Cited

OTHER PUBLICATIONS

Written Opinion of the International Searching Authority for PCT/CN2022/086735 dated, Jun. 16, 2022 (PCT/ISA/237).

* cited by examiner

IMAGE ATTACK DETECTION METHOD AND APPARATUS, AND IMAGE ATTACK DETECTION MODEL TRAINING METHOD AND APPARATUS

CROSS-REFERENCE TO RELATED APPLICATIONS

This application is a continuation application of International Application No. PCT/CN2022/086735, filed on Apr. 14, 2022, which claims priority to Chinese Patent Application No. 202110431153.1, filed with the China National Intellectual Property Administration on Apr. 21, 2021, the disclosures of each of which being incorporated by reference herein in their entireties.

FIELD

The disclosure relates to the field of computer technologies, and in particular, to an image attack detection method and apparatus, an image attack detection model training method and apparatus, a computer device, and a storage medium.

BACKGROUND

With the development of an image recognition technology, an image counterattack technology has emerged. For example, image recognition is attacked by means of physical attack (an attack region may be generated on a physical side by means of 3D printing, etc.), so that the result of image recognition becomes an erroneous result, thereby easily causing security risks. At present, a pixel value of the attack region is usually modified by pre-processing or post-processing means to destroy a physical attack effect, such as adding image filtering and color transformation. However, a current defense manner against physical attacks is very easy to be avoided, so that the accuracy of image attack detection is reduced, and the security risks are caused.

SUMMARY

According to various embodiments, an image attack detection method may include: acquiring an image-to-be-detected, and performing global classification recognition based on the image-to-be-detected to obtain a global classification recognition result; performing local image extraction randomly based on the image-to-be-detected to obtain a target number of local images, the target number being obtained by calculation according to a defensive rate of a reference image corresponding to the image-to-be-detected, and the defensive rate of the reference image being used for characterizing a defense level of the reference image being attacked by an image; performing local classification recognition based on the target number of local images respectively to obtain respective local classification recognition results, and fusing the respective local classification recognition results to obtain a target classification recognition result; and detecting a similarity between the target classification recognition result and the global recognition result, and determining the image-to-be-detected as an attack image when the target classification recognition result and the global classification recognition result are dissimilar.

According to various embodiments, an image attack detection model training method may include: acquiring training data, the training data including a training image and an image attack category label; inputting the training image into a global image classification recognition model for global classification recognition to obtain a training global classification recognition result vector; performing local image extraction randomly based on the training image to obtain a training target number of training local images, the training target number being obtained by calculating a defensive rate of a training reference image corresponding to the training image, and the defensive rate of the training reference image being used for characterizing a defense level of the training reference image being attacked by an image; inputting the target number of training local images into a local image classification recognition model for local classification recognition respectively to obtain respective training local classification recognition result vectors, and fusing the respective training local classification recognition result vectors to obtain a target training classification recognition result vector; inputting the target training classification recognition result vector and the training global classification recognition result vector into an initial image attack detection model for consistency detection of recognition results to obtain an initial consistency detection result; and updating the initial image attack detection model based on the initial consistency detection result and the image attack category label, re-performing the operation of inputting the target training classification recognition result vector and the training global classification recognition result vector into an initial image attack detection model for consistency detection of recognition results to obtain an initial consistency detection result, and obtaining a target image attack detection model upon the training completion.

According to various embodiments, an image attack detection apparatus, an image attack detection model training apparatus, a computer device, and a non-transitory computer-readable storage medium consistent with the foregoing methods may also be provided.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DESCRIPTION OF EMBODIMENTS

Figure 1:
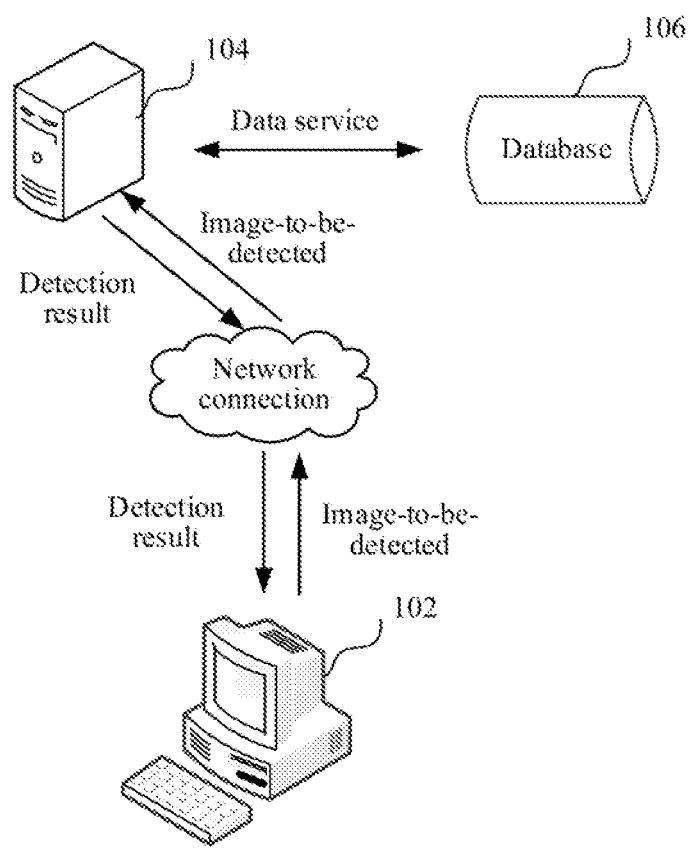
FIG. 1 is a diagram of an application environment of an image attack detection method according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

According to the above-mentioned image attack detection method and apparatus, computer device and storage medium, an image-to-be-detected is acquired, and global classification recognition is performed based on the image-to-be-detected to obtain a global classification recognition result. Since a global recognition result of a real image is consistent with any local recognition result and an image attack by means of a physical attack cannot change each local recognition result, a target number of local images may be randomly extracted. The target number is obtained by calculation according to a defensive rate of a reference image corresponding to an image-to-be-detected, and the defensive rate of the reference image is used for characterizing a defense level of the reference image being attacked by an image, thus recognizing respective local classification recognition results and then fusing the respective local classification recognition results. When an obtained target classification recognition result is inconsistent with a global classification recognition result, the image-to-be-detected is determined as an attack image, so that the accuracy of image attack detection can be improved, and the security risks can be reduced.

In the above-mentioned image attack detection model training method, a training image is inputted into a global image classification recognition model for global classification recognition to obtain a training global classification recognition result vector. Local image extraction is performed randomly based on the training image to obtain a training target number of training local images. The training target number is obtained by calculating a defensive rate of a training reference image corresponding to the training image, and the defensive rate of the training reference image is used for characterizing a defense level of the training reference image being attacked by an image. The target number of training local images is inputted into a local image classification recognition model for local classification recognition respectively to obtain respective training local classification recognition result vectors, and the respective training local classification recognition result vectors are fused to obtain a target training classification recognition result vector. The target training classification recognition result vector and the training global classification recognition result vector are inputted into an initial image attack detection model for consistency detection of recognition results to obtain an initial consistency detection result. The initial image attack detection model is updated based on the initial consistency detection result and the image attack category label, and loop iteration is performed to obtain a target image attack detection model. That is, the obtained target image attack detection model is trained by using the target training classification recognition result vector and the training global classification recognition result, so that the obtained target image attack detection model can improve the accuracy of consistency detection, and thus improve the accuracy of image attack detection.

In the following descriptions, related "some embodiments" describe a subset of all possible embodiments. However, it may be understood that the "some embodiments" may be the same subset or different subsets of all the possible embodiments, and may be combined with each other without conflict.

An image attack detection method provided in some embodiments may be applied to an application environment shown in FIG. 1. A terminal 102 communicates with a server 104 through a network. The server 104 acquires an image-to-be-detected transmitted by the terminal 102, and performs global classification recognition based on the image-to-be-detected to obtain a global classification recognition result. The server 102 performs local image extraction randomly based on the image-to-be-detected to obtain a target number of local images. The target number is obtained by calculation according to a defensive rate of a reference image corresponding to the image-to-be-detected, and the defensive rate of the reference image is used for characterizing a defense level of the reference image being attacked by an image. The server 104 performs local classification recognition based on the target number of local images respectively to obtain respective local classification recognition results, and fuses the respective local classification recognition results to obtain a target classification recognition result. The server 104 detects the consistency of recognition results based on the target classification recognition result and the global recognition result, and determines the image-to-be-detected as an attack image in a case that the target classification recognition result and the global classification recognition result are inconsistent. The server 104 transmits a detection result to the terminal for displaying, and may also store the detection result into a database 106. The terminal 102 may be, but not limited to, a desktop computer, a notebook computer, a smartphone, a tablet computer, and a portable wearable device. The server 104 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal and the server may be directly or indirectly connected in a wired or wireless communication manner.

Figure 2:
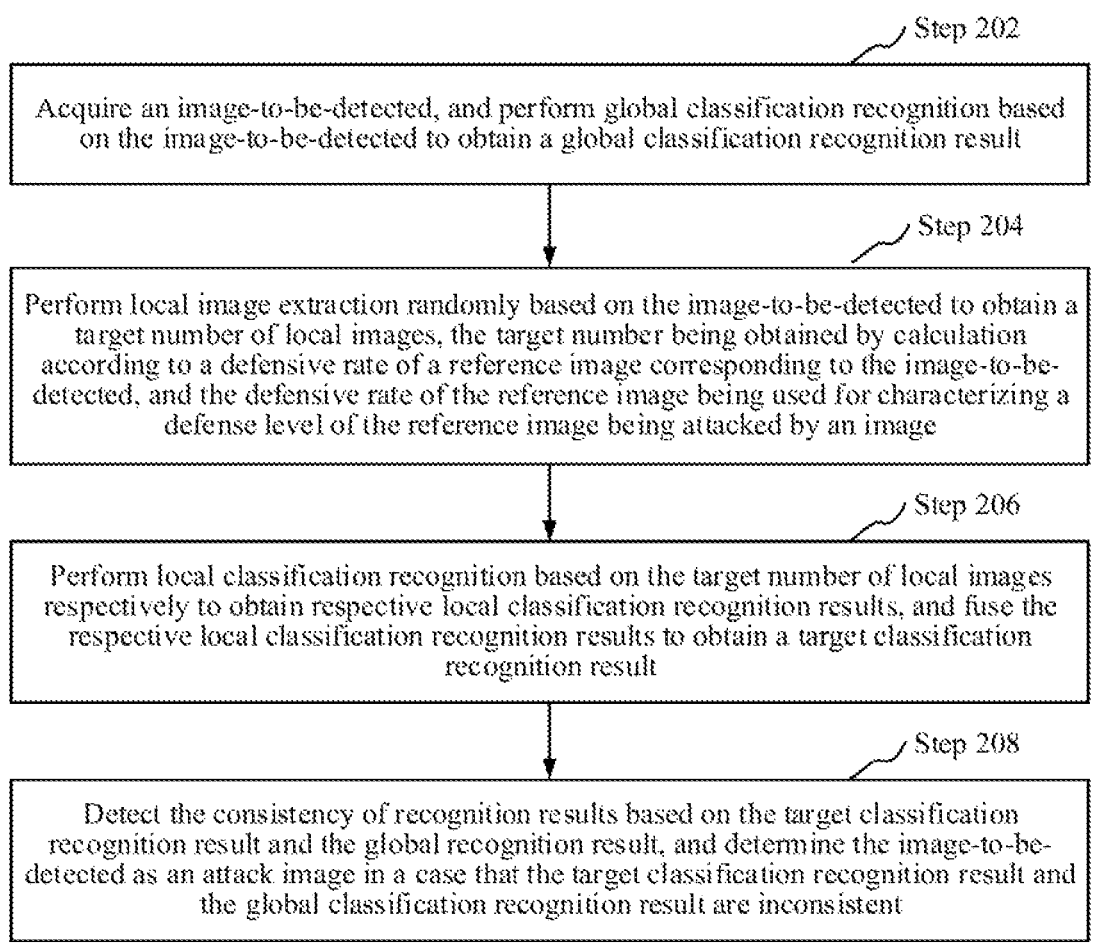
FIG. 2 is a schematic flowchart of an image attack detection method according to some embodiments.

In some embodiments, as shown in FIG. 2, an image attack detection method is provided. By using an example in which the method is applied to the server in FIG. 1 for description, it is to be understood that the method may also be applied to the terminal or a system including the terminal and the server, and is implemented by the interaction of the terminal and the server. In some embodiments, the method includes the following operations:

Operation 202: Acquire an image-to-be-detected, and perform global classification recognition based on the image-to-be-detected to obtain a global classification recognition result.

The image-to-be-detected refers to an image required to be subjected to image attack detection for detecting whether the image-to-be-detected is a real image or an attack image. The real image refers to a real image, and the attack image refers to an attack-countering image. Counterattack is a technology that makes wrong judgment on classification recognition by imposing disturbance on images. A physical attack is one of the important branches. The physical attack is characterized by imposing unrestricted disturbance on a local region of an image to form an attack region. Because the attack region may be generated on a physical side by means of 3D printing, etc., the attack region has a large amount of disturbance, and is unlikely to be disturbed by environmental conditions, thereby more likely causing security risks. The image-to-be-detected may be any image with an image content to be classified and recognized. For example, the image may be a face image which is subjected to face recognition, face detection and face living detection. The image may be an object image for object classification recognition, such as an image of a vehicle or an obstacle. The image may be a species image for species classification recognition, such as an image of a cat or a dog. The global classification recognition result refers to a result obtained by classifying and recognizing the image-to-be-detected as a whole.

Specifically, the server may acquire an image-to-be-detected transmitted by the terminal, may also acquire an image-to-be-detected from the server, may also collect an image-to-be-detected from the Internet, and may also acquire an image-to-be-detected provided by a service server, etc. Then the server performs global classification recognition on the image-to-be-detected to obtain a global classification recognition result. A global image classification recognition model established by using a neural network algorithm may be used in advance, and deployed in the server. When an image-to-be-detected is acquired, the global image classification recognition model is invoked to perform global classification recognition on the image-to-be-detected so as to obtain a global classification recognition result.

Operation 204: Perform local image extraction randomly based on the image-to-be-detected to obtain a target number of local images, the target number being obtained by calculation according to a defensive rate of a reference image corresponding to the image-to-be-detected, and the defensive rate of the reference image being used for characterizing a defense level of the reference image being attacked by an image.

The reference image is an image for determining a local image extraction number, and the size of the reference image corresponds to the size of the image-to-be-detected. The defensive rate of the reference image is used for characterizing a defense level of the reference image being attacked by an image, and the defense level refers to the possibility that an image attack detection result is an attack image when the reference image is the attack image.

Specifically, the server performs local image extraction randomly on the image-to-be-detected according to a target number to obtain the target number of local images. Each local image extraction is performed on the whole of the image-to-be-detected, and it is ensured that the respective local image extractions are independent of each other. The size of the extracted local images is predetermined and the sizes of all local images are the same. In some embodiments, the size of a local image may be determined according to a preset proportional relationship between a local image size and a global image size or according to a preset proportional relationship between a local image area and a global image area. The target number may be obtained by calculation according to a defensive rate of a reference image corresponding to the image-to-be-detected, and the defensive rate of the reference image may be used for characterizing a defense level of the reference image being attacked by an image. In some embodiments, the size of the extracted local images may be any size, i.e. the size of different local images may be different.

Operation 206: Perform local classification recognition based on the target number of local images respectively to obtain respective local classification recognition results, and fuse the respective local classification recognition results to obtain a target classification recognition result.

The local classification recognition result refers to a result obtained by classifying and recognizing the local images. The target classification recognition result refers to an integrated result of the respective local classification recognition results.

Specifically, the server performs local classification recognition on the target number of local images respectively to obtain respective local classification recognition results. A local image classification recognition model established by using a neural network algorithm may be used first, and then deployed in the server. When an image-to-be-detected is acquired, the local image classification recognition model is invoked to perform local classification recognition on the local images so as to obtain a local classification recognition result. Each local image is subjected to local classification recognition in sequence to obtain a target number of local classification recognition results, the target number of local classification recognition results are added to obtain a total local classification recognition result, and then average calculation is performed according to the total local classification recognition result and the target number to obtain a target classification recognition result. In some embodiments, the server may also first perform weighting processing on the target number of local classification recognition results to obtain a weighted local classification recognition result, and then perform average calculation according to the weighted local classification recognition result and the target number to obtain a target classification recognition result. The weight may be determined according to an area size of the local images or determined according to an average pixel of the local images.

Operation 208: Detect the consistency of recognition results based on the target classification recognition result and the global recognition result, and determine the image-to-be-detected as an attack image in a case that the target classification recognition result and the global classification recognition result are inconsistent.

Specifically, the server determines the consistency of a target classification recognition result and a global recognition result detection recognition result. The target classification recognition result and the global recognition result detection recognition result may be matched, the consistency is determined according to a matching result, the similarity between the target classification recognition result and the global recognition result detection recognition result may also be calculated, and the consistency is determined according to the similarity. Consistency detection recognition may also be performed by a pre-established image attack detection model. When the target classification recognition result is inconsistent with the global classification recognition result, it is indicated that the global classification recognition result is an erroneous result formed after counterattack. At this moment, it is determined that the image-to-be-detected is an attack image. When the target classification recognition result is consistent with the global classification recognition result, it is indicated that the global classification recognition result is a real result, and it is determined that the image-to-be-detected is a real image.

According to the above-mentioned image attack detection method and apparatus, computer device and storage medium, an image-to-be-detected is acquired, and global classification recognition is performed based on the image-to-be-detected to obtain a global classification recognition result. Since a global recognition result of a real image is consistent with any local recognition result and an image attack by means of a physical attack cannot change each local recognition result, a target number of local images may be randomly extracted. The target number is obtained by calculation according to a defensive rate of a reference image corresponding to an image-to-be-detected, and the defensive rate of the reference image is used for characterizing a defense level of the reference image being attacked by an image, thus recognizing respective local classification recognition results and then fusing the respective local classification recognition results. When an obtained target classification recognition result is inconsistent with a global classification recognition result, the image-to-be-detected is determined as an attack image, so that the accuracy of image attack detection can be improved, and the security risks can be reduced.

Figure 3:
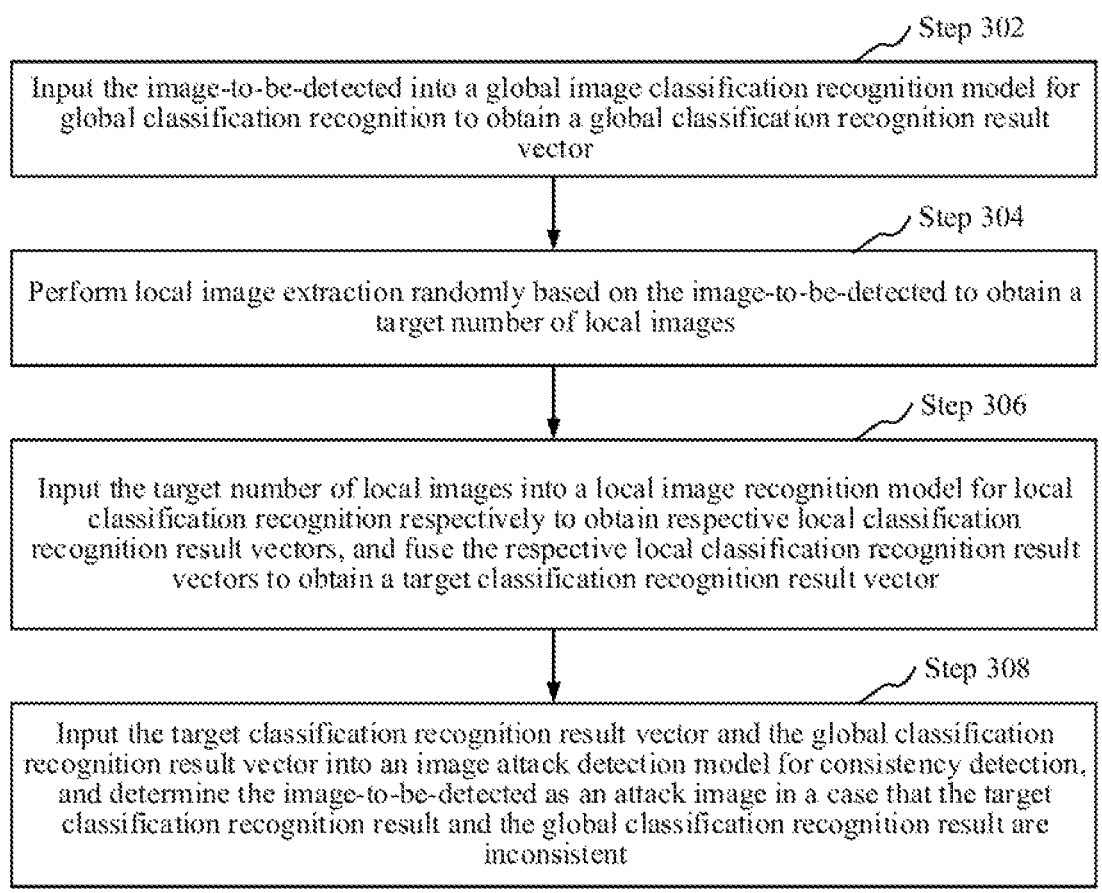
FIG. 3 is a schematic flowchart of an image attack detection method according to some embodiments.

In some embodiments, as shown in FIG. 3, the image attack detection method further includes:

Operation 302: Input the image-to-be-detected into a global image classification recognition model for global classification recognition to obtain a global classification recognition result vector.

The global image classification recognition model refers to an image classification recognition model obtained by training a global image through a neural network algorithm for performing classification recognition on the global image. The neural network algorithm may be a convolutional neural networks (CNN) algorithm, a recurrent neural network (RNN) algorithm, etc. In a specific embodiment, the neural network algorithm may be a ResNet18 (residual network) algorithm or may be a VGGNet (deep convolutional neural network) algorithm, an Inception (convolutional neural network structure) network algorithm, a DenseNet (densely connected convolutional networks) algorithm, etc.

Specifically, the server may obtain a global image classification recognition model by training a global image through a neural network algorithm in advance, and deploy and use the global image classification recognition model. When obtaining an image-to-be-detected, the server inputs the image-to-be-detected into a global image classification recognition model for global classification recognition to obtain an outputted global classification recognition result vector. The global classification recognition result vector refers to a classification probability vector of the image-to-be-detected as a whole, i.e. the probability that each element in the global classification recognition result vector is used for characterizing a corresponding category. In some embodiments, the image-to-be-detected may also be inputted into the global image classification recognition model for global classification recognition, and a feature map outputted by a convolution layer when performing global classification recognition is obtained as a global classification recognition result vector.

Operation 304: Perform local image extraction randomly based on the image-to-be-detected to obtain a target number of local images.

Operation 306: Input the target number of local images into a local image recognition model for local classification recognition respectively to obtain respective local classification recognition result vectors, and fuse the respective local classification recognition result vectors to obtain a target classification recognition result vector.

The local image recognition model refers to a model obtained by training using local images through a neural network algorithm, and may also be a model obtained by further training a global image recognition model using local images. The local image recognition model is used for performing classification recognition on local images. The local classification recognition result vector refers to a classification probability vector corresponding to the local images, i.e. the probability that each element in the local classification recognition result vector is used for characterizing a corresponding category. The target classification recognition result vector refers to a fused local classification recognition result vector, and the target classification recognition result is used for characterizing a classification recognition result of images obtained when the local images are used for classification recognition.

Specifically, the server obtains a target number by calculating according to a defensive rate of a reference image corresponding to the image-to-be-detected, and the defensive rate of the reference image is used for characterizing a defense level of the reference image being attacked by an image. Then local image extraction is performed randomly on the image-to-be-detected according to the target number to obtain a target number of local images. The server inputs each local image into the local image recognition model for local classification recognition to obtain respective local classification recognition result vectors. In some embodiments, the local images may also be inputted into the local image classification recognition model for local classification recognition, and a feature map outputted by a convolution layer when performing local classification recognition is obtained as a local classification recognition result vector. Then the server fuses the respective local classification recognition result vectors to obtain a target classification recognition result vector.

In some embodiments, the server may calculate an average vector of the respective local classification recognition result vectors to obtain a target classification recognition result vector. That is, a vector sum of the respective local classification recognition result vectors is calculated, a ratio of the vector sum to the target number is then calculated to obtain an average vector, and the average vector is taken as a target classification recognition result vector.

In some embodiments, the server may also obtain weights corresponding to the respective local classification recognition result vectors, and perform a weighted average on the weights corresponding to the respective local classification recognition result vectors to obtain a target classification recognition result vector. The weights corresponding to the respective local classification recognition result vectors may be determined according to the importance of the local images, and the importance of the local images may be obtained by calculation through a class activation mapping (CAM) algorithm.

Operation 308: Input the target classification recognition result vector and the global classification recognition result vector into an image attack detection model for consistency detection, and determine the image-to-be-detected as an attack image in a case that the target classification recognition result and the global classification recognition result are inconsistent.

The image attack detection model is used for detecting the consistency of the target classification recognition result vector and the global classification recognition result so as to obtain a model of a determining result. The determining result may be that the image-to-be-detected is an attack image or a real image. The image attack detection model is a binary classification model, which is obtained by training using a target classification recognition result vector and a global classification recognition result of a training image through a binary classification algorithm in advance. The binary classification algorithm may be a linear regression algorithm, a support vector machine algorithm, a neural network algorithm, a decision tree algorithm, a random forest algorithm, etc.

Specifically, the server, when obtaining a target classification recognition result vector and a global classification recognition result, may directly input the target classification recognition result vector and the global classification recognition result vector into the image attack detection model for consistency detection. A detection result that the image-to-be-detected is an attack image is outputted when the image attack detection model determines that the target classification recognition result and the global classification recognition result are inconsistent.

In some embodiments, the server concatenates the target local recognition result vector and the global recognition result vector end to end to obtain a concatenated vector. It is possible that the target local recognition result vector and the global recognition result vector are concatenated in tandem to obtain a concatenated vector, or the global recognition result vector and the target local recognition result vector are concatenated in tandem to obtain a concatenated vector. The concatenated vector is then inputted to the image attack detection model, and the consistency of the target local recognition result vector and the global recognition result vector is detected through the image attack detection model. When it is determined that the target classification recognition result and the global classification recognition result are consistent, a detection result that the image-to-be-detected is a real image is outputted, and when it is determined that the target classification recognition result and the global classification recognition result are inconsistent, a detection result that the image-to-be-detected is an attack image is outputted.

In the above-mentioned embodiments, global classification recognition is performed on the image-to-be-detected by using the global image recognition model, local classification recognition is performed on the local images by using the local image recognition model, and the consistency of the target local recognition result vector and the global recognition result vector is finally detected through the image attack detection model, so as to obtain an image detection result, which not only improves the accuracy of image attack detection, but also improves the efficiency of image attack detection.

In some embodiments, the detection result of an image-to-be-detected may be stored on a blockchain to ensure the security and non-tampering of data.

Figure 4:
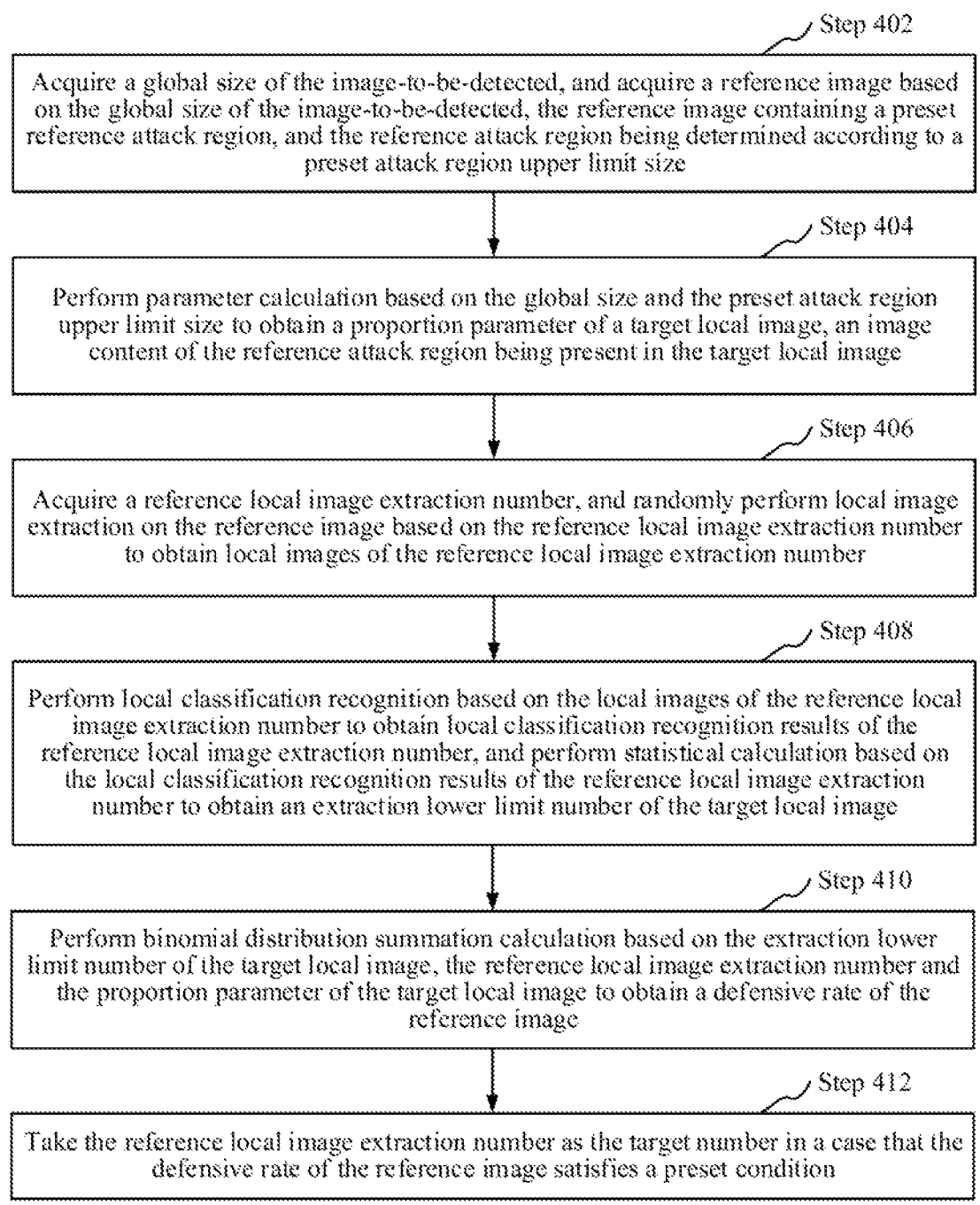
FIG. 4 is a schematic flowchart of obtaining a target number according to some embodiments.

In some embodiments, as shown in FIG. 4, the image attack detection method further includes:

Operation 402: Acquire a global size of the image-to-be-detected, and acquire a reference image based on the global size of the image-to-be-detected, the reference image containing a preset reference attack region, and the reference attack region being determined according to a preset attack region upper limit size.

The global size refers to the width and height of the image-to-be-detected. The reference attack region refers to a preset attack region in the reference image. The preset attack region upper limit size refers to preset maximum width and height of the attack region.

Specifically, the server obtains a global size of an image-to-be-detected. Different image classification recognition scenarios are classification recognition for images of different sizes. Different sizes of images-to-be-detected correspond to different target numbers. When the server obtains the global size of the image-to-be-detected, a reference image may be obtained according to the global size of the image-to-be-detected, and a global size of the reference image is consistent with the global size of the image-to-be-detected. The reference image contains a preset reference attack region, and the reference attack region is determined according to a preset attack region upper limit size.

Operation 404: Perform parameter calculation based on the global size and the preset attack region upper limit size to obtain a proportion parameter of a target local image, an image content of the reference attack region being present in the target local image.

The target local image refers to a local image having the image content of the reference attack region, and the local image is a local image corresponding to the reference image. The target local image may contain part of the reference attack region or all of the reference attack regions. The proportion parameter of the target local image refers to a ratio of the number of target local images corresponding to the reference image to the number of all local images. The proportion parameter of the target local image is used for characterizing the possibility of extracting the target local image during image extraction.

Specifically, the server may determine a local size of a local image to be extracted from the reference image according to the global size, and then perform parameter calculation using the global size, the local size and the preset attack region upper limit size to obtain a proportion parameter of a target local image.

In some embodiments, operation 404 of performing parameter calculation based on the global size and the preset attack region upper limit size to obtain a proportion parameter of a target local image includes the following operations:

determining a local size based on the global size, and calculating a total number of local images extractable from the reference image based on the global size and the local size; calculating a total number of target local images extractable from the reference image based on the global size, the local size and the preset attack region upper limit size; and calculating a ratio of the total number of target local images to the total number of local images to obtain a proportion parameter of the target local image.

The total number of local images extractable from the reference image refers to a maximum number of local images extractable from the reference image during local image extraction. The total number of target local images refers to a maximum number of target local images extractable from the reference image during local image extraction.

Specifically, the server may determine a local size corresponding to the global size of the reference image according to a preset proportional relationship between the global image and the local images. The local size is the size of the local images extracted from the reference image. Then the global size and the local size are used to calculate a total number of local images extractable from the reference image, and a total number of target local images extractable from the reference image is calculated using the global size, the local size and the preset attack region upper limit size. A ratio of the total number of target local images to the total number of local images is finally calculated to obtain a proportion parameter of the target local image.

In a specific embodiment, the server may calculate the total number of local images extractable from the reference image using Formula (1) shown below.

$$n_{al\_l}=(w-k_i+1)\times(h-k_j+1) \quad \text{Formula (1)}$$

$n_{al\_l}$ represents the total number of local images, w represents the width in the global size, and h represents the height in the global size. $k_i$ represents the width in the local size, and $k_j$ represents the height in the local size. The server may calculate the total number of target local images extractable from the reference image using Formula (2) shown below.

$$n_{adv}=min(p_i+k_i-1,w-k_i+1)\times min(p_j+k_j-1,h+k_j+1) \quad \text{Formula (2)}$$

$n_{adv}$ represents the total number of target local images, $p_i$ represents the width in the preset attack region upper limit size, and $p_j$ represents the height in the preset attack region upper limit size. The server may calculate the proportion parameter of the target local image using Formula (3) shown below.

$$p_{la} = \frac{n_{adv}}{n_{all}} \quad \text{Formula (3)}$$

$p_{la}$ represents the proportion parameter of the target local image.

Operation 406: Acquire a reference local image extraction number, and randomly perform local image extraction on the reference image based on the reference local image extraction number to obtain local images of the reference local image extraction number.

The reference local image extraction number refers to a local image extraction number to be determined.

Specifically, the server may obtain the reference local image extraction number from the terminal or may obtain the reference local image extraction number from the database. Local image extraction is randomly performed on the reference image based on the reference local image extraction number to obtain local images of the reference local image extraction number. The server extracts independently when performing local image extraction, i.e. performs local image extraction on the basis of reference local images each time.

Operation 408: Perform local classification recognition based on the local images of the reference local image extraction number to obtain local classification recognition results of the reference local image extraction number, and perform statistical calculation based on the local classification recognition results of the reference local image extraction number to obtain an extraction lower limit number of the target local image.

Specifically, the server may perform local classification recognition on the local images of the reference local image extraction number respectively using the local image classification recognition model to obtain local classification recognition results of the reference local image extraction number. A maximum number of local classification recognition results and a second maximum number of local classification recognition results in the local classification recognition results of the reference local image extraction number are calculated, and an extraction lower limit number of the target local image is obtained by calculation using the maximum number of local classification recognition results and the second maximum number of local classification recognition results.

In some embodiments, the operation of performing statistical calculation based on the local classification recognition results of the reference local image extraction number to obtain an extraction lower limit number of the target local image includes the following operations:

calculating the number of first categories and the number of second categories in the local classification recognition results of the reference local image extraction number, the first categories referring to maximum categories in the local classification recognition results of the reference local image extraction number, and the second categories referring to maximum categories except for the first categories in the local classification recognition results of the reference local image extraction number; and calculating an extraction lower limit number of the target local image based on the number of first categories and the number of second categories.

Different local classification recognition results may have different categories. For example, a face image of A is locally extracted to obtain a local image during face recognition. When the local image is recognized, there is a recognition result of A in local recognition results, and there may also be other recognition results, such as recognition as B and recognition as C.

Specifically, the server counts categories according to the local classification recognition results of the reference local image extraction number to obtain local classification recognition result numbers of different categories, ranks respective categories according to the local classification recognition result numbers of different categories, takes maximum categories of the local classification recognition result numbers as first categories, and takes maximum categories except for the first categories in the local classification recognition results of the reference local image extraction number as second categories. The first categories are real classification recognition results corresponding to the reference image. An extraction lower limit number of the target local image is calculated using the number of first categories and the number of second categories. The extraction lower limit number of the target local image is the number of local classification recognition results to be changed at least when the attack image is to succeed in attacking.

In a specific embodiment, the extraction lower limit number of the target local image may be obtained by calculation using Formula (4) shown below.

$$n_a = \frac{n_{c1} - n_{c2}}{2} + 1 \qquad \text{Formula (4)}$$

$n_a$ represents the extraction lower limit number of the target local image, $n_{c1}$ represents the number of first categories, and $n_{c2}$ represents the number of second categories.

Operation 410: Perform binomial distribution summation calculation based on the extraction lower limit number of the target local image, the reference local image extraction number and the proportion parameter of the target local image to obtain a defensive rate of the reference image.

Specifically, the server performs calculation using a binomial distribution summation formula based on the extraction lower limit number of the target local image, the reference local image extraction number and the proportion parameter of the target local image to obtain a defensive rate of the reference image.

In a specific embodiment, the defensive rate of the reference image may be obtained by calculation using a binomial distribution summation formula (5) shown below.

$$p_e = \Sigma_{i=0}^{n_a} c_N^i p_{l\_a}^i (1-p_{l\_a})^{(N-1)} \qquad \text{Formula (5)}$$

$p_e$ represents the defensive rate of the reference image, and the defensive rate of the reference image is used for characterizing the probability that the reference local image extraction number does not exceed the extraction lower limit number of the target local image. N refers to the reference local image extraction number. That is, $p_e$ is a function that increases monotonically with the variable N. When $p_e$ is 1, the classification recognition is not attacked by an attack image in any case, that is, all attack images can be detected.

Operation 412: Take the reference local image extraction number as the target number in a case that the defensive rate of the reference image satisfies a preset condition.

The preset condition refers to a preset defensive rate condition, which may be a defensive rate lower limit value. Different defensive rate lower limit values may be set in different image classification recognition scenarios, i.e. may be set according to requirements.

Specifically, the server takes the reference local image extraction number as the target number when determining that the defensive rate of the reference image satisfies the preset condition. When the defensive rate of the reference image does not satisfy the preset condition, an updated reference local image extraction number is obtained, the updated reference local image extraction number is taken as the reference local image extraction number, operation 406 is re-performed for iterative execution, and when the defensive rate of the reference image satisfies the preset condition, the reference local image extraction number is taken as the target number.

In the above-mentioned embodiments, the defensive rate of the reference image is obtained through binomial distribution summation calculation of the extraction lower limit number of the target local image, the proportion parameter of the target local image and the reference local image extraction number, which are obtained by calculation, so that the obtained defensive rate of the reference image is more accurate. Thus, when the defensive rate of the reference image satisfies the preset condition, the reference local image extraction number is taken as the target number, so that the determined target number is more accurate.

In some embodiments, the image attack detection method further includes the following operations:

acquiring respective reference local image extraction numbers, obtaining corresponding respective defensive rates by calculating based on the respective reference local image extraction numbers, and establishing an association relationship between the reference local image extraction numbers and the defensive rates based on the respective reference local image extraction numbers and the corresponding respective defensive rates; and acquiring a preset defensive rate corresponding to the image-to-be-detected, searching for a target reference local image extraction number corresponding to the preset defensive rate from the association relationship between the reference local image extraction numbers and the defensive rates, and taking the target reference local image extraction number as a target number.

The association relationship between the reference local image extraction numbers and the defensive rates refers to a one-to-one corresponding relationship between the reference local image extraction numbers and the defensive rates, and the preset defensive rate refers to a defense level when a preset image-to-be-detected is attacked by an image.

Specifically, the server acquires respective reference local image extraction numbers, and obtains corresponding respective defensive rates by calculating based on the respective reference local image extraction numbers. A defensive rate corresponding to each reference local image extraction number is obtained by calculating a proportion parameter of the target local image corresponding to each reference local image extraction number and an extraction lower limit number of the target local image and performing binomial distribution summation calculation using each reference local image extraction number, the proportion parameter of the target local image and the extraction lower limit number of the target local image. Then each reference local image extraction number and the corresponding defensive rate are associatively stored. When image attack detection is required for an image-to-be-detected, a preset defensive rate corresponding to the image-to-be-detected is acquired, a target reference local image extraction number corresponding to the preset defensive rate is searched from the stored association relationship between the reference local image extraction numbers and the defensive rates, and the target reference local image extraction number is taken as a target number. As the defensive rate is higher, the corresponding reference local image extraction number is larger.

In the above-mentioned embodiments, the respective reference local image extraction numbers and the corresponding defensive rates are associatively stored. When a preset defensive rate corresponding to an image-to-be-detected is obtained, a corresponding target reference local image extraction number may be directly found, and the target reference local image extraction number may be taken as a target number, so that the efficiency of obtaining the target number can be improved.

In some embodiments, operation 412 of taking the reference local image extraction number as the target number includes the following operations:

acquiring resource information corresponding to a current device, and determining a current local image extraction number based on the resource information corresponding to the current device; taking the current local image extraction number as the target number in a case that the reference local image extraction number exceeds the current local image extraction number; and taking the reference local image extraction number as the target number in a case that the reference local image extraction number does not exceed the current local image extraction number.

The current device refers to a device that performs image attack detection. Resource information refers to resources that can be used by the current device when performing image attack detection, and the resources include but are not limited to internal memory resources, storage resources, computing resources, and time resources. The internal memory resources refer to an internal memory that can be occupied by the current device during image attack detection. The storage resources refer to a storage space that can be used by the current device during image attack detection. The computing resources refer to a hash rate that can be used by the current device during image attack detection. The time resources refer to time that can be consumed by the current device during image attack detection. The current local image extraction number refers to the number of local images extractable under the resource information of the current device.

Specifically, the server obtains resource information corresponding thereto, and the resource information may be pre-allocated. Then the server determines a current local image extraction number according to the corresponding resource information, and the server determines the current local image extraction number according to the resource information corresponding to the current device by means of resource information consumed when extracting local images in sequence. And then the server takes the current local image extraction number as the target number when determining that the reference local image extraction number exceeds the current local image extraction number. The reference local image extraction number is taken as the target number in a case that the reference local image extraction number does not exceed the current local image extraction number. For example, a time resource of the current device is 1 s, and time spent in image attack detection will not exceed 1 s according to a target number determined based on the time resource.

In some embodiments, resource information of a current device is acquired, a current local image extraction number is determined based on the resource information of the current device and then compared with the reference local image extraction number to finally determine a target number, and the obtained target number is a processable number for the server, i.e. the current device, thereby avoiding the resource information consumed for image attack detection from exceeding the resource information of the current device.

Figure 5:
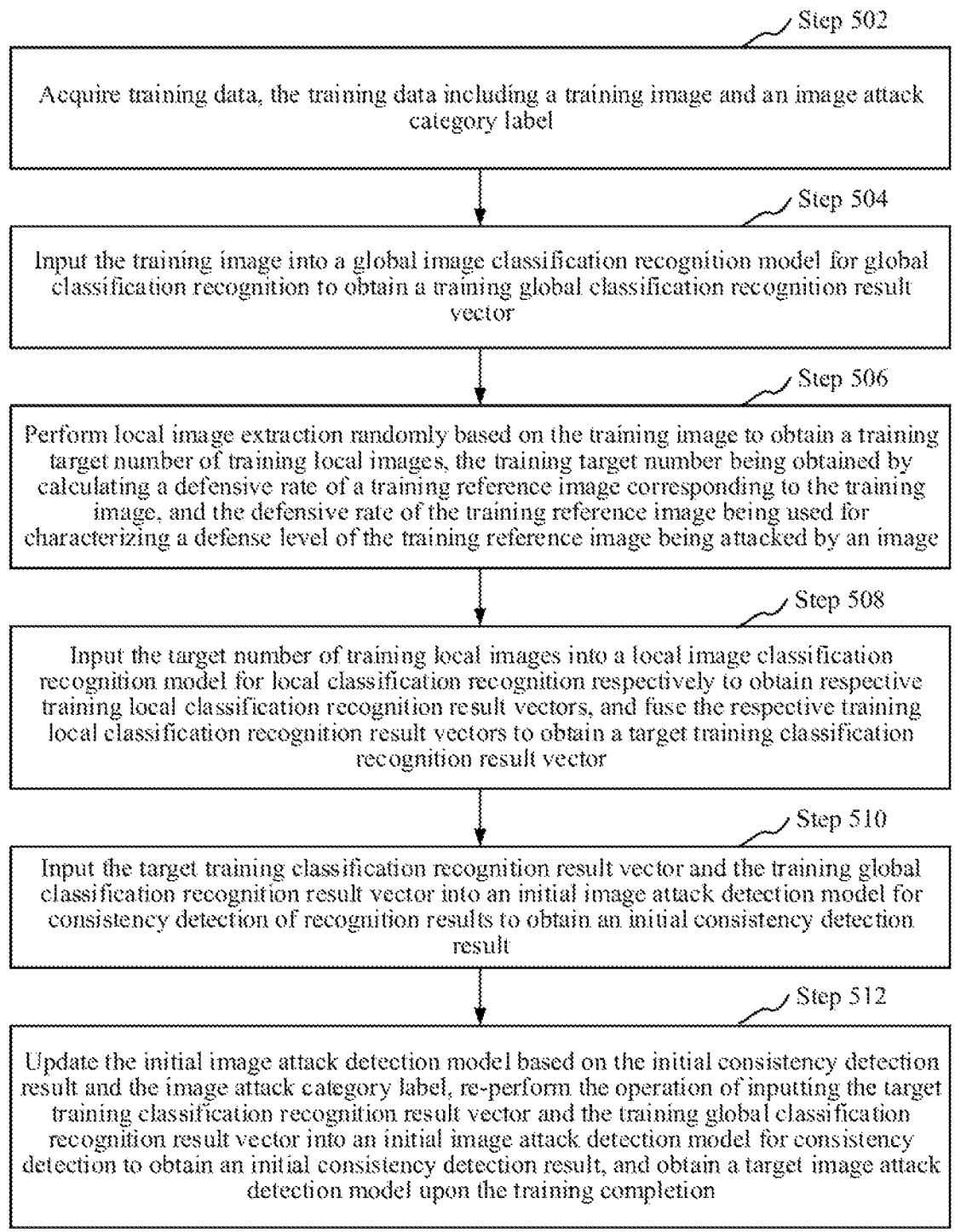
FIG. 5 is a schematic flowchart of an image attack detection model training method according to some embodiments.

In some embodiments, as shown in FIG. 5, an image attack detection model training method is provided. By using an example in which the method is applied to the server in FIG. 1 for description, it is to be understood that the method may also be applied to the terminal or a system including the terminal and the server, and is implemented by the interaction of the terminal and the server. In some embodiments, the method includes the following operations:

Operation 502: Acquire training data, the training data including a training image and an image attack category label.

The training image refers to an image used by training an image attack detection model. The image attack category label refers to an attack category label corresponding to the training image. The attack category label includes a label indicating that the training image is a real image and a label indicating that the training image is an attack image.

Specifically, the server may obtain training data from the database, may obtain training data from a third-party database, and may collect training data from the Internet.

Operation 504: Input the training image into a global image classification recognition model for global classification recognition to obtain a training global classification recognition result vector.

The global image classification recognition model is a pre-trained neural network model for performing classification recognition on global images. The training global classification recognition result vector is a global classification recognition result vector corresponding to the training image as a whole.

Specifically, the server inputs the training image into a global image classification recognition model for global classification recognition to obtain a training global classification recognition result vector.

Operation 506: Perform local image extraction randomly based on the training image to obtain a training target number of training local images, the training target number being obtained by calculating a defensive rate of a training reference image corresponding to the training image, and the defensive rate of the training reference image being used for characterizing a defense level of the training reference image being attacked by an image.

The training target number refers to the number of local images-to-be-extracted corresponding to the training image. The training reference image refers to a reference image during training.

Specifically, the server obtains a training target number, and randomly performs local image extraction on the training image according to the training target number to obtain a training target number of training local images. For example, a fixed-size square region may be randomly cut out of an image according to the training target number to obtain training local images.

Operation 508: Input the target number of training local images into a local image classification recognition model for local classification recognition respectively to obtain respective training local classification recognition result vectors, and fuse the respective training local classification recognition result vectors to obtain a target training classification recognition result vector.

The local image classification recognition model refers to a pre-trained neural network model for performing classification recognition on local images. The training local classification recognition result vector refers to a local classification recognition result vector corresponding to the training local image. The target training classification recognition result vector is a vector obtained by fusing respective training local classification recognition result vectors.

Specifically, the server inputs the target number of training local images into a local image classification recognition model for local classification recognition respectively to obtain respective training local classification recognition result vectors, then calculates an average vector of the respective training local classification recognition result vectors, and takes the average vector as the target training classification recognition result vector.

Operation 510: Input the target training classification recognition result vector and the training global classification recognition result vector into an initial image attack detection model for consistency detection of recognition results to obtain an initial consistency detection result.

The initial image attack detection model refers to an image attack detection model with model parameters initialized. The initial consistency detection result refers to an initial consistency detection result, and the consistency detection result refers to a result of determining whether an image, obtained by whether the target training classification recognition result vector is consistent with the training global classification recognition result, is an attack image.

Specifically, the server may concatenate the target training classification recognition result vector and the training global classification recognition result vector to obtain a concatenated vector, and input the concatenated vector into the initial image attack detection model. The initial image attack detection model detects the consistency of the target training classification recognition result vector and the training global classification recognition result vector, and outputs an initial consistency detection result.

Operation 512: Update the initial image attack detection model based on the initial consistency detection result and the image attack category label, re-perform the operation of inputting the target training classification recognition result vector and the training global classification recognition result vector into an initial image attack detection model for consistency detection of recognition results to obtain an initial consistency detection result, and obtain a target image attack detection model upon the training completion.

Specifically, the server calculates a loss value of the initial consistency detection result and the image attack category label using a binary classification loss function. The binary classification loss function may be a cross entropy loss function. It is determined whether the loss value has reached a preset loss threshold. When the loss value has not reached the preset loss threshold, initialized parameters in the initial image attack detection model are updated based on the loss value to obtain an updated image attack detection model, the updated image attack detection model is taken as an initial image attack detection model, the operation of inputting the target training classification recognition result vector and the training global classification recognition result vector into an initial image attack detection model for consistency detection of recognition results to obtain an initial consistency detection result is re-performed for iterative execution, and when the loss value has reached the preset loss threshold, the initial image attack detection model reaching the preset loss threshold is taken as the target image attack detection model.

In the above-mentioned image attack detection model training method, a training image is inputted into a global image classification recognition model for global classification recognition to obtain a training global classification recognition result vector. Local image extraction is performed randomly based on the training image to obtain a training target number of training local images. The target number of training local images is inputted into a local image classification recognition model for local classification recognition respectively to obtain respective training local classification recognition result vectors, and the respective training local classification recognition result vectors are fused to obtain a target training classification recognition result vector. The target training classification recognition result vector and the training global classification recognition result vector are inputted into an initial image attack detection model for consistency detection of recognition results to obtain an initial consistency detection result. The initial image attack detection model is updated based on the initial consistency detection result and the image attack category label, and loop iteration is performed to obtain a target image attack detection model. That is, the obtained target image attack detection model is trained by using the target training classification recognition result vector and the training global classification recognition result, so that the obtained target image attack detection model can improve the accuracy of consistency detection, and thus improve the accuracy of image attack detection.

Figure 6:
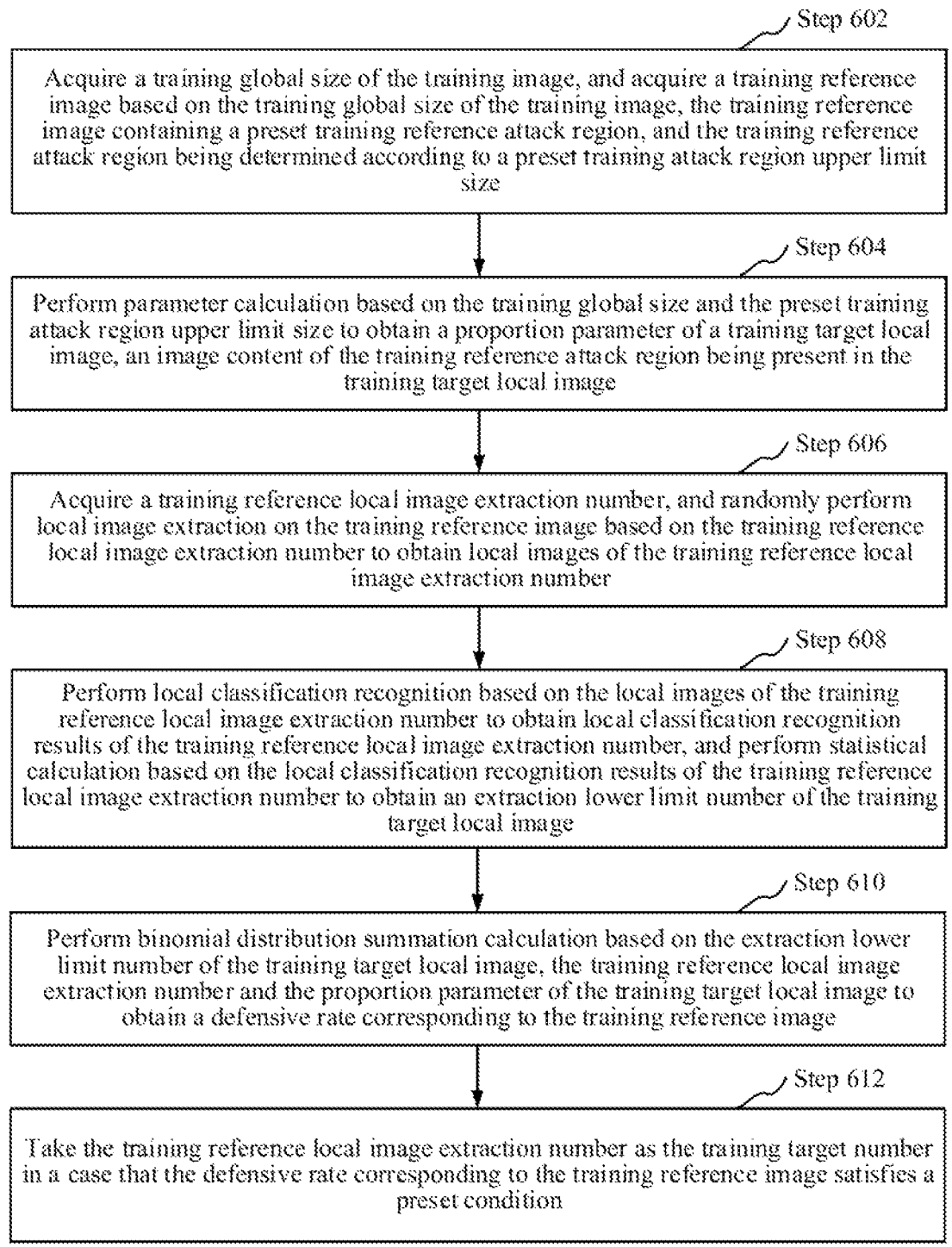
FIG. 6 is a schematic flowchart of obtaining a training target number according to some embodiments.

In some embodiments, as shown in FIG. 6, the image attack detection model training method further includes the following operations:

Operation 602: Acquire a training global size of the training image, and acquire a training reference image based on the training global size of the training image, the training reference image containing a preset training reference attack region, and the training reference attack region being determined according to a preset training attack region upper limit size.

The training global size refers to the size of the training image, i.e. width and height. The training reference attack region is a preset attack region in the training image. The preset training attack region upper limit size refers to a preset maximum size of the attack region, i.e. width and height.

Specifically, the server obtains a training global size of the training image, and acquires a training reference image based on the training global size of the training image. The size of the training reference image may be consistent with the training global size of the training image. In some embodiments, the training global size of the training image is consistent with the global size of the image-to-be-detected.

Operation 604: Perform parameter calculation based on the training global size and the preset training attack region upper limit size to obtain a proportion parameter of a training target local image, an image content of the training reference attack region being present in the training target local image.

The training target local image refers to a local image having a training reference attack region during training, and the training target local image may contain part of the training reference attack region or all of the training reference attack regions. The proportion parameter of the training target local image refers to a ratio of the number of training target local images corresponding to the training reference image to the number of all training local images, and is used for characterizing the possibility of extracting the training target local image when the training image is extracted.

Specifically, the server may determine a training local size of a training local image to be extracted from the training reference image according to the training global size, and then perform parameter calculation using the training global size, the training local size and the preset training attack region upper limit size to obtain a proportion parameter of a training target local image.

In some embodiments, operation 604 includes the following operations: determining a training local size based on the training global size, and calculating a total number of training local images extractable from the training reference image based on the training global size and the training local size; calculating a total number of training target local images extractable from the training reference image based on the training global size, the training local size and the preset training attack region upper limit size; and calculating a ratio of the total number of training target local images to the total number of training local images to obtain a proportion parameter of the training target local image.

The total number of training local images extractable from the training reference image refers to a maximum number of local images extractable from the training reference image during local image extraction. The total number of training target local images refers to a total number of target local images extractable from the training reference image.

Specifically, the server may determine a training local size from the training global size according to a preset size relationship between global images and local images. Then a total number of training local images extractable from the training reference image is calculated based on the training global size and the training local size. For example, the total number of training local images extractable from the reference image may be obtained by calculation using Formula (1). Then a total number of training target local images extractable from the training reference image is calculated using the training global size, the training local size and the preset training attack region upper limit size. For example, by using Formula (2), the total number of training target local images extractable from the reference image may be obtained by calculation. Finally, a ratio of the total number of training target local images to the total number of training local images is calculated to obtain a proportion parameter of the training target local image. For example, the proportion parameter of the training target local image may be obtained by calculation using Formula (3).

Operation 606: Acquire a training reference local image extraction number, and randomly perform local image extraction on the training reference image based on the training reference local image extraction number to obtain local images of the training reference local image extraction number.

The training reference local image extraction number refers to a local image extraction number to be determined during training.

Specifically, the server obtains a training reference local image extraction number, and randomly performs local image extraction on the training reference image based on the training reference local image extraction number to obtain local images of the training reference local image extraction number.

Operation 608: Perform local classification recognition based on the local images of the training reference local image extraction number to obtain local classification recognition results of the training reference local image extraction number, and perform statistical calculation based on the local classification recognition results of the training reference local image extraction number to obtain an extraction lower limit number of the training target local image.

Specifically, the server may input the local images of the training reference local image extraction number into the local image classification recognition model for local classification recognition to obtain outputted local classification recognition results of the training reference local image extraction number. Then a maximum number of local classification recognition results and a second maximum number of local classification recognition results in the local classification recognition results of the training reference local image extraction number are calculated, and an extraction lower limit number of the training target local image is obtained using the maximum number of local classification recognition results and the second maximum number of local classification recognition results.

In some embodiments, operation 608 includes the following operations: calculating the number of first training categories and the number of second training categories in the local classification recognition results of the training reference local image extraction number, the first training categories referring to maximum categories in the local classification recognition results of the training reference local image extraction number, and the second training categories referring to maximum categories except for the first training categories in the local classification recognition results of the training reference local image extraction number; and calculating an extraction lower limit number of the training target local image based on the number of first training categories and the number of second training categories.

Specifically, the server calculates the number of first training categories corresponding to maximum categories in the local classification recognition results of the training reference local image extraction number, and calculates the number of second training categories corresponding to maximum categories except for the first training categories in the local classification recognition results of the training reference local image extraction number. Then an extraction lower limit number of the training target local image is calculated using the number of first training categories and the number of second training categories. The extraction lower limit number of the training target local image may be obtained by calculation using Formula (4).

Operation 610: Perform binomial distribution summation calculation based on the extraction lower limit number of the training target local image, the training reference local image extraction number and the proportion parameter of the training target local image to obtain a defensive rate corresponding to the training reference image.

Specifically, the server performs calculation using a binomial distribution summation formula based on the extraction lower limit number of the training target local image, the training reference local image extraction number and the proportion parameter of the training target local image to obtain a defensive rate corresponding to the training reference image. That is, the defensive rate corresponding to the training reference image may be obtained by calculation using Formula (5).

Operation 612: Take the training reference local image extraction number as the training target number in a case that the defensive rate corresponding to the training reference image satisfies a preset condition.

Specifically, the server takes the training reference local image extraction number as the training target number when determining that the defensive rate of the training reference image satisfies the preset condition. When the defensive rate of the training reference image does not satisfy the preset condition, an updated training reference local image extraction number is obtained, the updated training reference local image extraction number is taken as the training reference local image extraction number, operation 606 is re-performed for iterative execution, and when the defensive rate of the training reference image satisfies the preset condition, the training reference local image extraction number is taken as the training target number.

In the above-mentioned embodiments, binomial distribution summation calculation is performed through the extraction lower limit number of the training target local image, the training reference local image extraction number and the proportion parameter of the training target local image, which are obtained by calculation, to obtain a defensive rate corresponding to the training reference image, and then a training target number is determined according to the defensive rate corresponding to the training reference image, so that the obtained training target number is more accurate.

Figure 7:
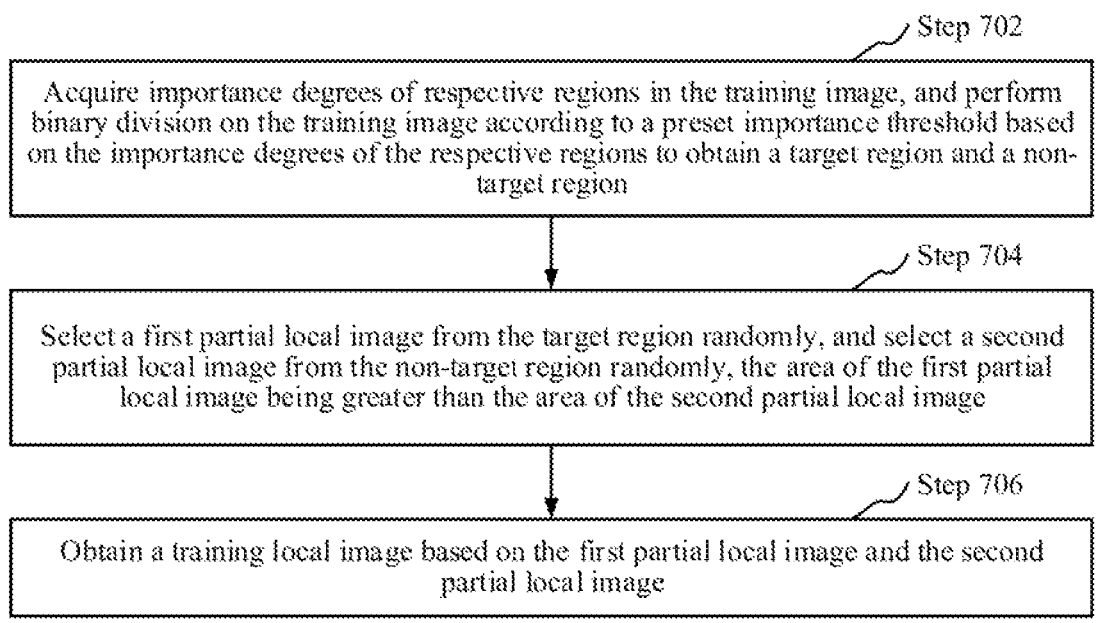
FIG. 7 is a schematic flowchart of obtaining a training local image according to some embodiments.

In some embodiments, as shown in FIG. 7, operation 506 of performing local image extraction randomly based on the training image to obtain a training target number of training local images includes the following operations:

Operation 702: Acquire importance degrees of respective regions in the training image, and perform binary division on the training image according to a preset importance threshold based on the importance degrees of the respective regions to obtain a target region and a non-target region.

The importance degree of a region is used for characterizing the importance degree of the region during classification. The preset importance threshold refers to a preset importance threshold when performing binary division on an image. The target region refers to a region with the importance degree exceeding the preset importance threshold. The non-target region refers to a region with the importance degree not exceeding the preset importance threshold.

Specifically, the server obtains importance degrees of regions in the training image, obtains a preset importance threshold, and performs binary division on the importance degrees of the respective regions according to the preset importance threshold to obtain a target region and a non-target region. A CAM algorithm may be used for determining importance degrees of the respective regions in the training image for classification, and generate a CAM thermodynamic chart. Then a threshold is set, a part of the thermodynamic chart exceeding the threshold is defined as the target region, and a binarized graph is generated. The CAM algorithm takes a weight of the last fully connected layer in the classification recognition model as the importance degree of different regions to the classification result, determines the importance degree of each channel feature map before the global average pooling through the weight, adds the channel feature maps according to the weight, and scales to an original map size, thereby determining the importance degree of each region in an original map.

Figure 8:
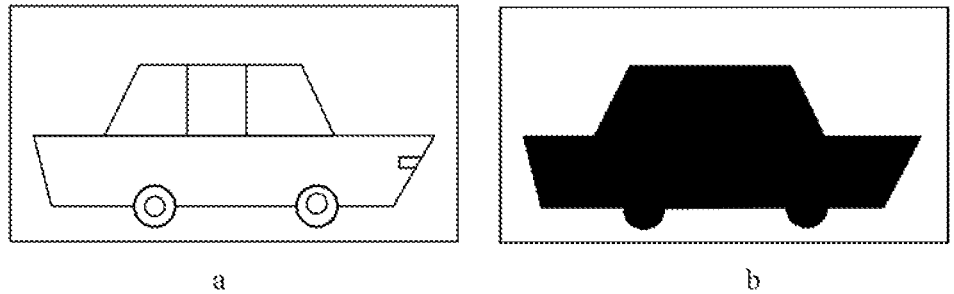
FIG. 8 is a schematic diagram of a binarization result of a training local image according to some embodiments.

In some embodiments, as shown in FIG. 8, in order to obtain a schematic diagram of a target region and a non-target region, graph a in FIG. 8 is classified and recognized to obtain a weight of the last fully connected layer in the classification recognition model. An importance degree of each channel feature map is determined through the weight. The channel feature maps are added according to the weight, and are scaled to an original map size so as to determine the importance degree of each region in the original map. Then an importance threshold is obtained. Graph a in FIG. 8 is subjected to binary division according to the importance threshold, so as to obtain graph b in FIG. 8. The target region is a black portion, and the non-target region is a white portion.

Operation 704: Select a first partial local image from the target region randomly, and select a second partial local image from the non-target region randomly, the area of the first partial local image being greater than the area of the second partial local image.

Operation 706: Obtain a training local image based on the first partial local image and the second partial local image.

Specifically, the server selects a first partial local image from the target region randomly, and selects a second partial local image from the non-target region randomly. The area of the selected first partial local image is greater than the area of the selected second partial local image. Then the extracted first partial local image and the extracted second partial local image are fused to obtain a training local image. In some embodiments, the server selects a local image from the binarized training image, the local image having an area that overlaps the target region by more than 50%.

In the above-mentioned embodiments, the classification recognition of the local image can be more accurate by ensuring more image contents of the target region in the randomly extracted local image.

Figure 9:
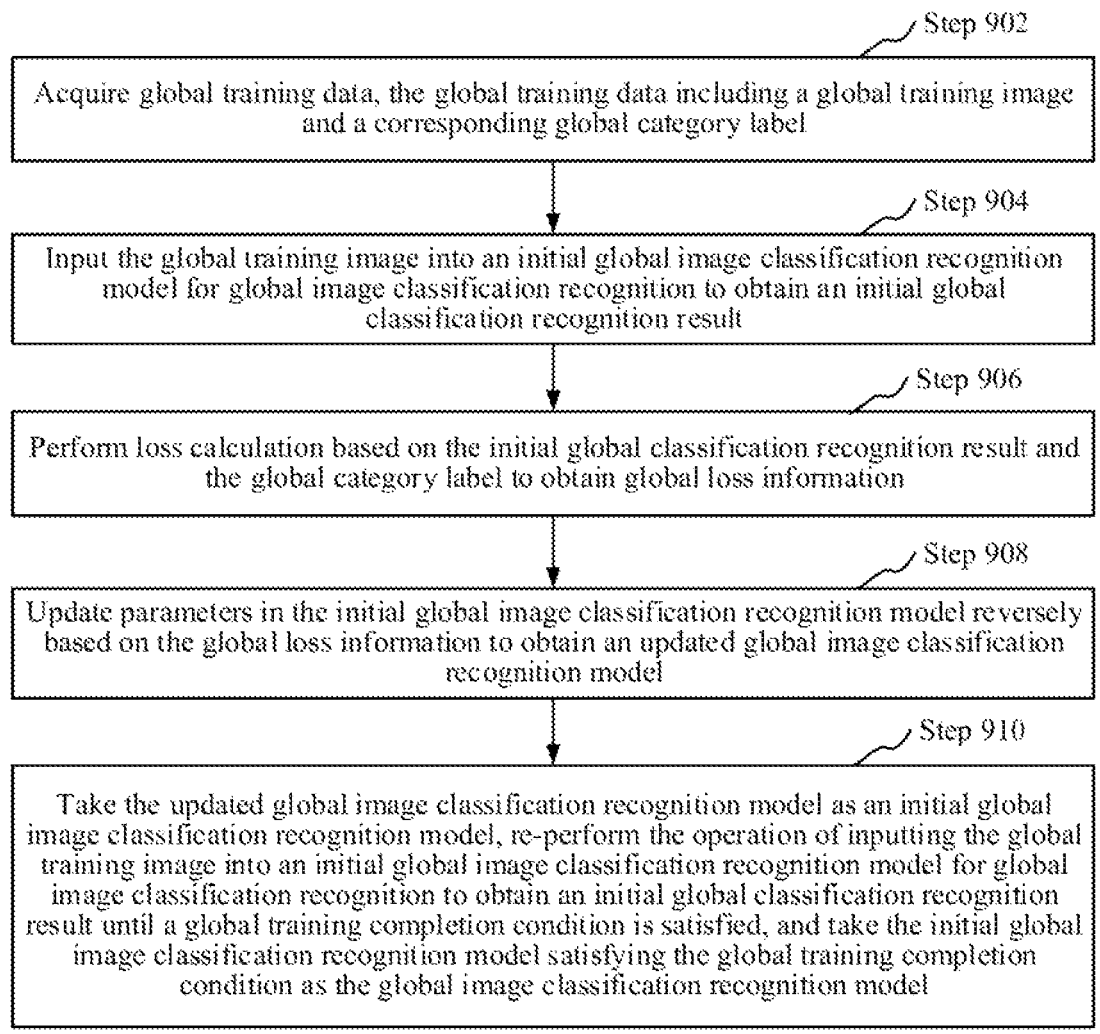
FIG. 9 is a schematic flowchart of obtaining a global image classification recognition model according to some embodiments.

In some embodiments, as shown in FIG. 9, the training of the global image classification recognition model includes the following operations:

Operation 902: Acquire global training data, the global training data including a global training image and a corresponding global category label.

The global training data refers to training data used when training the global image classification recognition model. The global training image refers to an image used when training the global image classification recognition model, and is a complete image. The global category label refers to a category label corresponding to the global training image.

Specifically, the server may directly obtain global training data from the database, may obtain global training data from a third-party database, and may collect global training data from the Internet.

Operation 904: Input the global training image into an initial global image classification recognition model for global image classification recognition to obtain an initial global classification recognition result.

The initial global image classification recognition model refers to a global image classification recognition model with model parameters initialized. The initial global classification recognition result refers to a global classification recognition result obtained using initialized parameters.

Specifically, the server inputs the global training image into an initial global image classification recognition model for global image classification recognition to obtain an outputted initial global classification recognition result.

Operation 906: Perform loss calculation based on the initial global classification recognition result and the global category label to obtain global loss information.

The global loss information refers to a model loss corresponding to the global training image, and is used for characterizing an error between a classification recognition result obtained by training and an actual classification recognition result.

Specifically, the server calculates a loss between the initial global classification recognition result and the global category label using a classification loss function to obtain global loss information. The classification loss function may be a cross entropy loss function, and may also be a logarithmic loss function, a squared loss function and an exponential loss function, etc.

Operation 908: Update parameters in the initial global image classification recognition model reversely based on the global loss information to obtain an updated global image classification recognition model.

Specifically, the server uses a gradient descent algorithm to reversely update parameters in the initial global image classification recognition model, i.e. calculates a gradient using global loss information, and reversely updates the parameters in the initial global image classification recognition model using the gradient. When the parameter update is completed, an updated global image classification recognition model is obtained.

In some embodiments, operation 908 includes the following operations: acquiring a current learning rate, and updating parameters of the initial global image classification recognition model reversely based on the current learning rate and the global loss information to obtain an updated global image classification recognition model. The current learning rate may be a currently used learning rate and may be set. The learning rate is a hyper-parameter in the training process.

Figure 10:
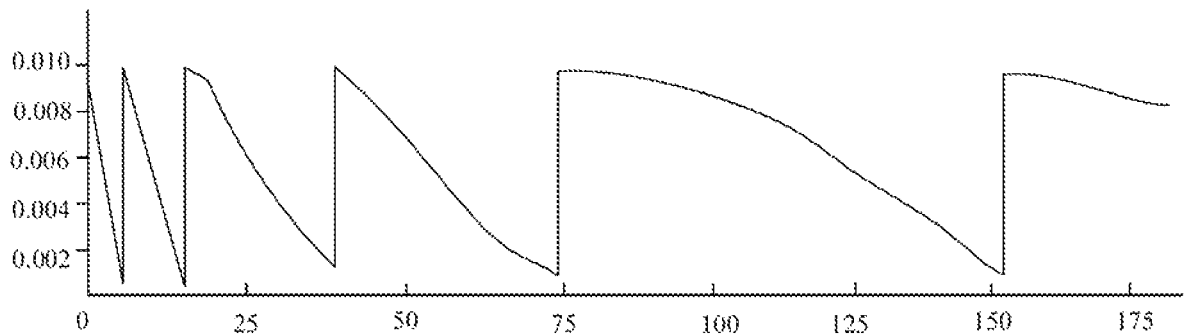
FIG. 10 is a schematic diagram of a learning rate change function according to some embodiments.

In some embodiments, the server may also acquire a historical learning rate, and adjust the historical learning rate using a preset cosine function to obtain a current learning rate. The learning rate may be adjusted using a preset cosine function. As shown in FIG. 10, the learning rate changes with reference to the law of the cosine function, i.e. the current learning rate jumps to the highest point directly after each fluctuation to the lowest point. Meanwhile, the cosine period is continuously prolonged.

In some embodiments, a warm up (adaptive training) attenuation strategy may also be used to adjust the learning rate. That is, training starts with a small learning rate, as the training progresses, the learning rate slowly increases to a certain extent, training is performed with the set initial learning rate, and then the learning rate gradually decreases.

Operation 910: Take the updated global image classification recognition model as an initial global image classification recognition model, re-perform the operation of inputting the global training image into an initial global image classification recognition model for global image classification recognition to obtain an initial global classification recognition result until a global training completion condition is satisfied, and take the initial global image classification recognition model satisfying the global training completion condition as the global image classification recognition model.

Specifically, the server takes the updated global image classification recognition model as an initial global image classification recognition model, re-performs the operation of inputting the global training image into an initial global image classification recognition model for global image classification recognition to obtain an initial global classification recognition result for iterative execution until a global training completion condition is satisfied, and takes the initial global image classification recognition model satisfying the global training completion condition as the global image classification recognition model. The global training completion condition may be that the global loss information is less than a preset loss threshold, or may be that a preset number of iterations is reached, etc.

In the above embodiments, the global image classification recognition model is obtained by training the initial global classification recognition model using the global training data, so as to facilitate subsequent use.

Figure 11:
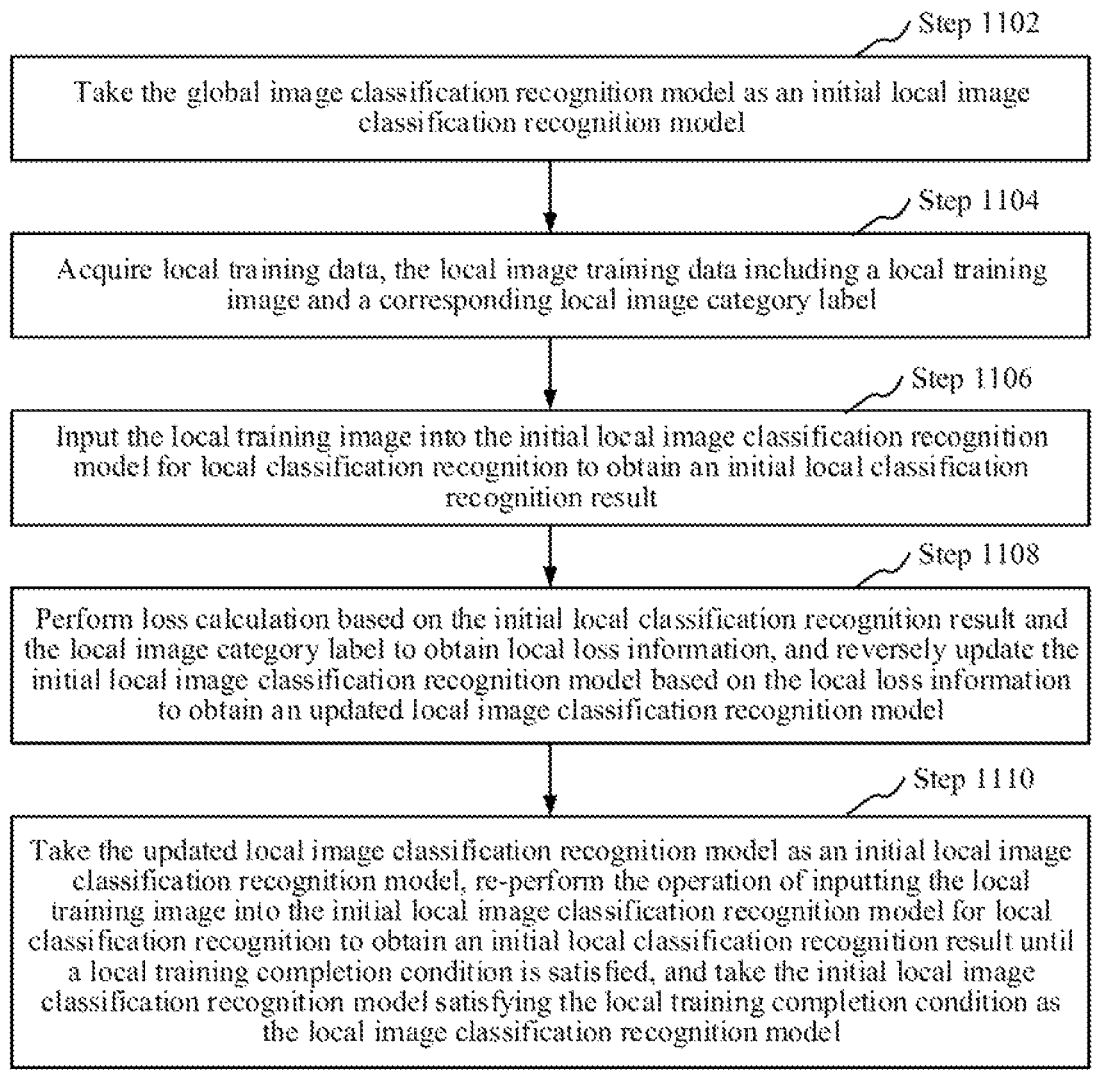
FIG. 11 is a schematic flowchart of obtaining a local image classification recognition model according to some embodiments.

In some embodiments, as shown in FIG. 11, the training of the local image classification recognition model includes the following operations:

Operation 1102: Take the global image classification recognition model as an initial local image classification recognition model.

Operation 1104: Acquire local training data, the local image training data including a local training image and a corresponding local image category label.

The local training image is a part of the complete image. The local image category label refers to a category label corresponding to the local training image.

Specifically, when training the local image classification recognition model, the server may perform fine adjustment training on the basis of the trained global image classification recognition model. That is, the server takes the global image classification recognition model as an initial local image classification recognition model. Local training data is then obtained from the database. Global training data may also be obtained, a local training image is extracted from a global training image of the global training data, and a global image category label corresponding to the global training image is taken as a local training image label. The local training data may also be obtained from a third-party database, or may also be collected from the Internet.

Operation 1106: Input the local training image into the initial local image classification recognition model for local classification recognition to obtain an initial local classification recognition result.

Operation 1108: Perform loss calculation based on the initial local classification recognition result and the local image category label to obtain local loss information, and reversely update the initial local image classification recognition model based on the local loss information to obtain an updated local image classification recognition model.

Specifically, the server inputs a local training image into the initial local image classification recognition model for local classification recognition to obtain an initial local classification recognition result, and then reversely updates the initial local image classification recognition model through a gradient descent algorithm. That is, a classification loss function is used for calculating local loss information between the initial local classification recognition result and the local image category label. The local loss information is used for characterizing an error between the initial local classification recognition result and the local image category label. Then parameters in the initial local image classification recognition model are reversely updated using the local loss information. When the parameter update is completed, an updated local image classification recognition model is obtained.

Operation 1110: Take the updated local image classification recognition model as an initial local image classification recognition model, re-perform the operation of inputting the local training image into the initial local image classification recognition model for local classification recognition to obtain an initial local classification recognition result until a local training completion condition is satisfied, and take the initial local image classification recognition model satisfying the local training completion condition as the local image classification recognition model.

Specifically, the server performs iterative training: taking the updated local image classification recognition model as an initial local image classification recognition model, and re-performing the operation of inputting the local training image into the initial local image classification recognition model for local classification recognition to obtain an initial local classification recognition result for iterative execution until a local training completion condition is satisfied. The local training completion condition includes that the local loss information obtained by training reaches a preset local loss threshold, the number of trainings reaches a preset upper limit of the number of iterations and the model parameters do not change any more. At this moment, the server takes the initial local image classification recognition model as a local image classification recognition model when the local training completion condition is reached.

In the above embodiments, the global image classification recognition model is taken as the initial local image classification recognition model, and then the initial local image classification recognition model is trained using the local training data, so as to obtain a local image classification recognition model, so that the efficiency of obtaining the local image classification recognition model can be improved.

Figure 12:
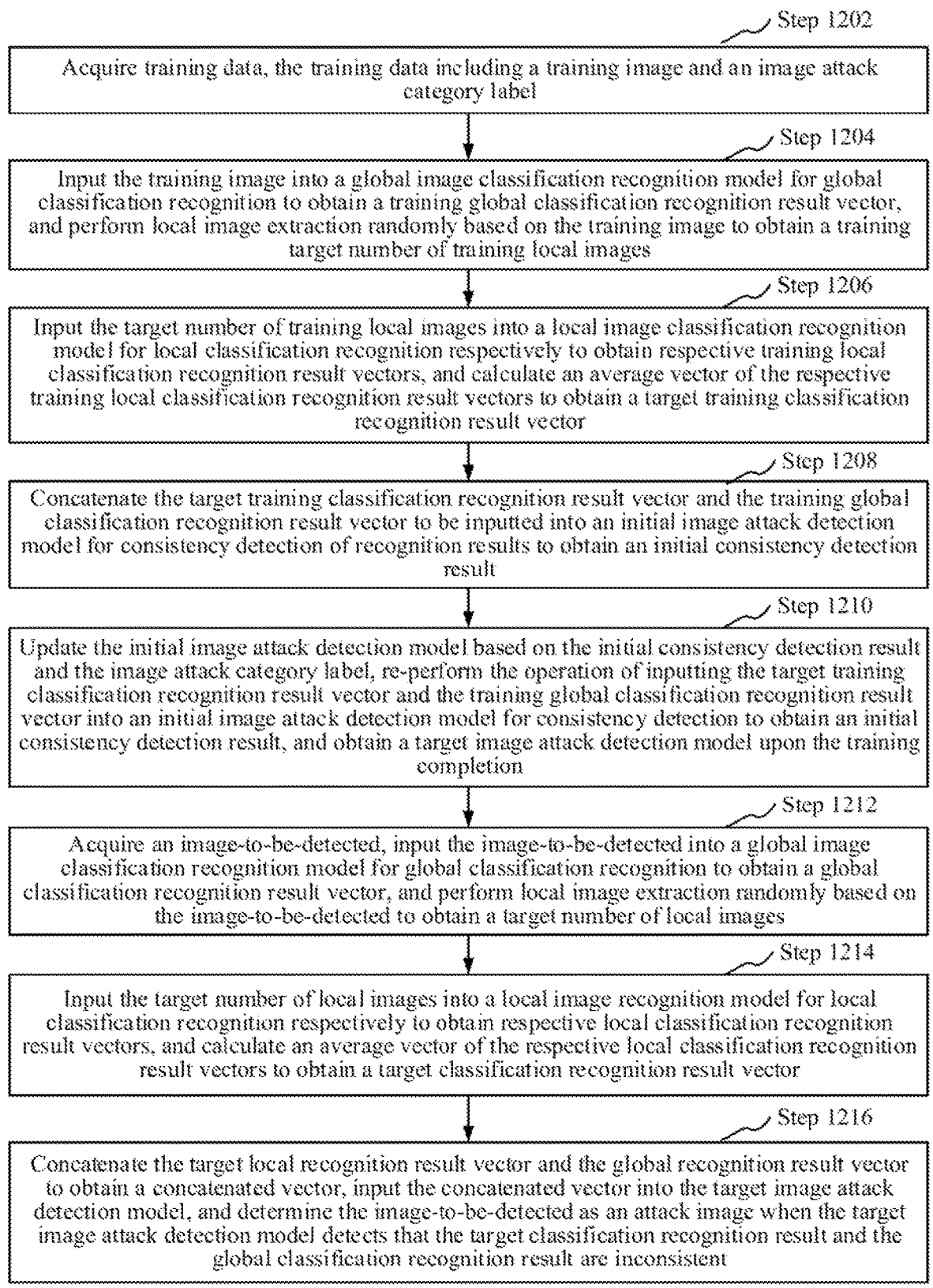
FIG. 12 is a schematic flowchart of an image attack detection method according to some embodiments.

In a specific embodiment, as shown in FIG. 12, an image attack detection method is provided, which specifically includes the following operations:

Operation 1202: Acquire training data, the training data including a training image and an image attack category label.

Operation 1204: Input the training image into a global image classification recognition model for global classification recognition to obtain a training global classification recognition result vector, and perform local image extraction randomly based on the training image to obtain a training target number of training local images.

Operation 1206: Input the target number of training local images into a local image classification recognition model for local classification recognition respectively to obtain respective training local classification recognition result vectors, and calculate an average vector of the respective training local classification recognition result vectors to obtain a target training classification recognition result vector.

Operation 1208: Concatenate the target training classification recognition result vector and the training global classification recognition result vector to be inputted into an initial image attack detection model for consistency detection of recognition results to obtain an initial consistency detection result.

Operation 1210: Update the initial image attack detection model based on the initial consistency detection result and the image attack category label, re-perform the operation of inputting the target training classification recognition result vector and the training global classification recognition result vector into an initial image attack detection model for consistency detection of recognition results to obtain an initial consistency detection result, and obtain a target image attack detection model upon the training completion.

Operation 1212: Acquire an image-to-be-detected, input the image-to-be-detected into a global image classification recognition model for global classification recognition to obtain a global classification recognition result vector, and perform local image extraction randomly based on the image-to-be-detected to obtain a target number of local images.

Operation 1214: Input the target number of local images into a local image recognition model for local classification recognition respectively to obtain respective local classification recognition result vectors, and calculate an average vector of the respective local classification recognition result vectors to obtain a target classification recognition result vector.

Operation 1216: Concatenate the target local recognition result vector and the global recognition result vector to obtain a concatenated vector, input the concatenated vector into the target image attack detection model, and determine the image-to-be-detected as an attack image when the target image attack detection model detects that the target classification recognition result and the global classification recognition result are inconsistent.

Figure 13:
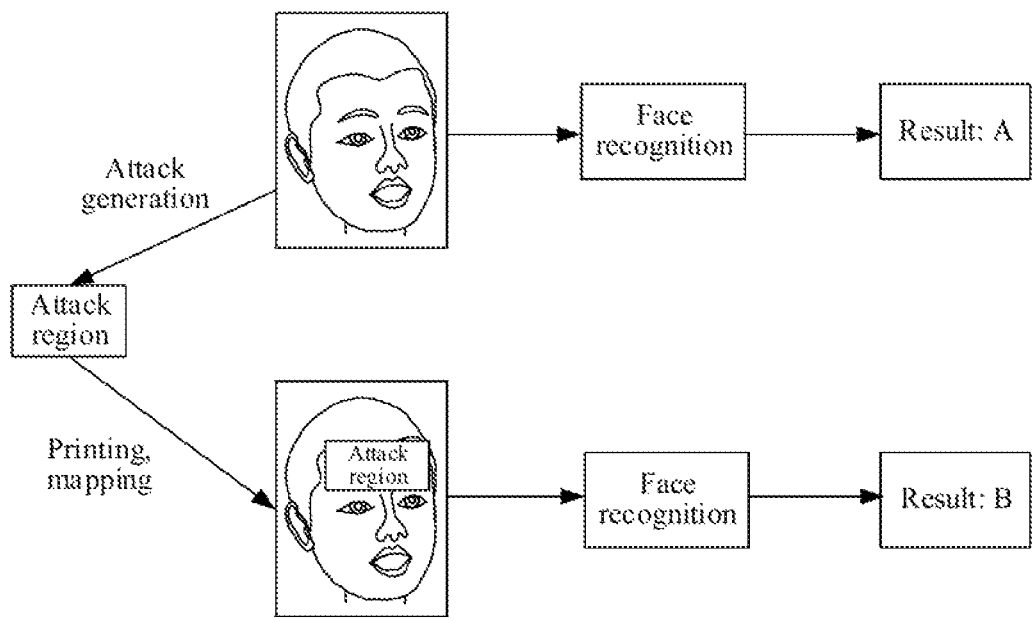
FIG. 13 is a schematic diagram of attacking from an attack image according to some embodiments.

In some embodiments, an application scenario in which the image attack detection method is applied is provided. Specifically, In a face recognition system, the identity of a person obtained through face image recognition is subjected to subsequent processing, for example, face unlocking. Currently, as shown in FIG. 13, a schematic diagram of an attack on a face recognition system from an attack image is shown. An attacker generates an attack region by counterattacking a real image, and the attack region is physically generated into an attack image. When the face recognition system recognizes a real image as A and then the face recognition system does not perform image attack detection again, the attacker uses the face recognition result as an erroneous result through the generated attack image, i.e. B.

Figure 14:
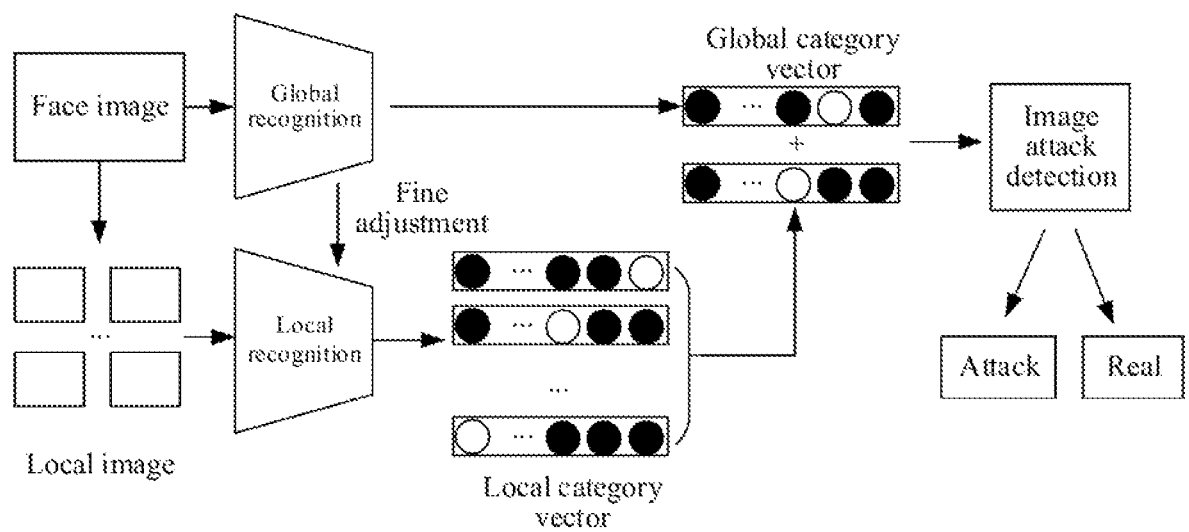
FIG. 14 is a schematic architectural diagram of an image attack detection method shown in FIG. 13.

At this moment, in some embodiments, the image attack detection method of is applied. As shown in FIG. 14, a schematic architectural diagram of image attack detection is shown. When the face recognition system needs to recognize a face image, the face image is taken as a face image-to-be-detected, the face image-to-be-detected is inputted into a global image classification recognition model for recognition to obtain a global category vector, a target number of local images are extracted from the face image-to-be-detected, the extracted target number of local images are inputted into a local image classification recognition model for recognition to obtain a local category vector, the local category vector is averagely calculated to obtain an average vector, and the average vector is concatenated with the global category vector and inputted into an image attack detection model for detection, so as to obtain a detection result indicating whether the face image-to-be-detected is an attack face image or a real face image. That is, the present disclosure can effectively resist a physical attack initiated by a dark industry link on a security system, thereby detecting and rejecting a corresponding attack. The image attack detection method in some embodiments can also be applied to an image text recognition scenario, can also be applied to a pedestrian detection scenario, and can also be applied to an object recognition scenario.

In some embodiments, the image attack detection method and the related art are tested for the defense effect against an adaptive attack, specifically using datasets CIFAR10 (a small dataset for recognizing pervasive objects) and ImageNet (an image dataset). The test comparison results obtained are shown in Table 1 below.

TABLE 1

| Test Comparison | | | | |
| --- | --- | --- | --- | --- |
| Dataset | Present disclosure (%) | Related art 1 (%) | Related art 2 (%) | Related art 3 (%) |
| CIFAR10 | 85.4 | 0.0 | 0.0 | 45.4 |
| ImageNet | 92.3 | 0.0 | 0.0 | 62.5 |

It can be obviously seen that the defensive rates on datasets CIFAR10 and ImageNet provided herein are much higher than the defensive rates in the related art. Related art 1 and related art 2 are completely not resistant to adaptive attacks due to mechanism reasons. Whereas, in the present disclosure, the defense effect against adaptive attacks can be significantly improved.

It is to be understood that although each operation of the flowcharts in FIG. 2 to FIG. 12 is displayed sequentially according to arrows, the operations are not necessarily performed according to an order indicated by arrows. Unless otherwise clearly specified in this specification, the operations are performed without any strict sequence limit, and may be performed in other sequences. Moreover, at least some of the operations in FIG. 2 to FIG. 12 may include a plurality of operations or a plurality of stages. These operations or stages are not necessarily performed at the same moment, but may be performed at different times. These operations or stages are not necessarily executed sequentially, but may be performed with at least one part of the other operations or operations of other operations or stages in turn.

Figure 15:
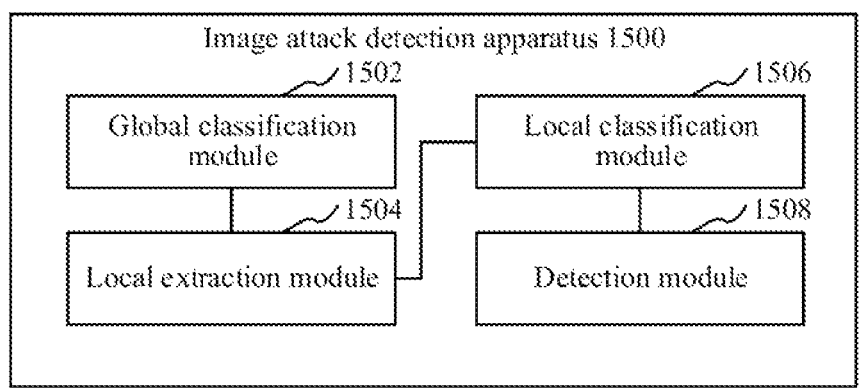
FIG. 15 is a structural block diagram of an image attack detection apparatus according to some embodiments.

In some embodiments, as shown in FIG. 15, an image attack detection apparatus 1500 is provided. The apparatus may be a part of a computer device using a software module or a hardware module or a combination of both. The apparatus specifically includes: a global classification module 1502, a local extraction module 1504, a local classification module 1506, and a detection module 1508.

The global classification module 1502 is configured to acquire an image-to-be-detected, and perform global classification recognition based on the image-to-be-detected to obtain a global classification recognition result.

The local extraction module 1504 is configured to perform local image extraction randomly based on the image-to-be-detected to obtain a target number of local images. The target number is obtained by calculation according to a defensive rate of a reference image corresponding to the image-to-be-detected, and the defensive rate of the reference image is used for characterizing a defense level of the reference image being attacked by an image.

The local classification module 1506 is configured to perform local classification recognition based on the target number of local images respectively to obtain respective local classification recognition results, and fuse the respective local classification recognition results to obtain a target classification recognition result.

The detection module 1508 is configured to detect the consistency of recognition results based on the target classification recognition result and the global recognition result, and determine the image-to-be-detected as an attack image in a case that the target classification recognition result and the global classification recognition result are inconsistent.

In some embodiments, the image attack detection apparatus 1500 further includes:
- a global model classification module, configured to input the image-to-be-detected into a global image classification recognition model for global classification recognition to obtain a global classification recognition result vector;
- a random extraction module, configured to perform local image extraction randomly based on the image-to-be-detected to obtain a target number of local images;
- a local model classification module, configured to input the target number of local images into a local image recognition model for local classification recognition respectively to obtain respective local classification recognition result vectors, and fuse the respective local classification recognition result vectors to obtain a target classification recognition result vector; and
- a detection model detecting module, configured to input the target classification recognition result vector and the global classification recognition result vector into an image attack detection model for consistency detection, and determine the image-to-be-detected as an attack image in a case that the target classification recognition result and the global classification recognition result are inconsistent.

In some embodiments, the detection model detecting module is further configured to concatenate the target local recognition result vector and the global recognition result vector to obtain a concatenated vector; and input the concatenated vector to the image attack detection model, recognize the consistency of the target local recognition result vector and the global recognition result vector through the image attack detection model, determine the image-to-be-detected as a real image in a case that the target classification recognition result and the global classification recognition result are consistent, and determine the image-to-be-detected as an attack image in a case that the target classification recognition result and the global classification recognition result are inconsistent.

In some embodiments, the local model classification module is further configured to calculate an average vector of the respective local classification recognition result vectors to obtain a target classification recognition result vector.

In some embodiments, the image attack detection apparatus 1500 further includes:
- a size acquisition module, configured to acquire a global size of the image-to-be-detected, and acquire a reference image based on the global size of the image-to-be-detected, the reference image containing a preset reference attack region, and the reference attack region being determined according to a preset attack region upper limit size;
- a parameter calculation module, configured to perform parameter calculation based on the global size and the preset attack region upper limit size to obtain a proportion parameter of a target local image, an image content of the reference attack region being present in the target local image;
- a reference local extraction module, configured to acquire a reference local image extraction number, and randomly perform local image extraction on the reference image based on the reference local image extraction number to obtain local images of the reference local image extraction number;
- a lower limit number calculation module, configured to perform local classification recognition based on the local images of the reference local image extraction number to obtain local classification recognition results of the reference local image extraction number, and perform statistical calculation based on the local classification recognition results of the reference local image extraction number to obtain an extraction lower limit number of the target local image;
- a defensive rate calculation module, configured to perform binomial distribution summation calculation based on the extraction lower limit number of the target local image, the reference local image extraction number and the proportion parameter of the target local image to obtain a defensive rate of the reference image; and
- a target number obtaining module, configured to take the reference local image extraction number as the target number in a case that the defensive rate of the reference image satisfies a preset condition.

In some embodiments, the parameter calculation module is further configured to determine a local size based on the global size, and calculate a total number of local images extractable from the reference image based on the global size and the local size; calculate a total number of target local images extractable from the reference image based on the global size, the local size and the preset attack region upper limit size; and calculate a ratio of the total number of target local images to the total number of local images to obtain a proportion parameter of the target local image.

In some embodiments, the lower limit number calculation module is further configured to calculate the number of first categories and the number of second categories in the local classification recognition results of the reference local image extraction number, the first categories referring to maximum categories in the local classification recognition results of the reference local image extraction number, and the second categories referring to maximum categories except for the first categories in the local classification recognition results of the reference local image extraction number; and calculate an extraction lower limit number of the target local image based on the number of first categories and the number of second categories.

In some embodiments, the image attack detection apparatus 1500 further includes:
a relationship establishment module, configured to acquire respective reference local image extraction numbers, obtain corresponding respective defensive rates by calculating based on the respective reference local image extraction numbers, and establish an association relationship between the reference local image extraction numbers and the defensive rates based on the respective reference local image extraction numbers and the corresponding respective defensive rates; and
a search module, configured to acquire a preset defensive rate corresponding to the image-to-be-detected, search for a target reference local image extraction number corresponding to the preset defensive rate from the association relationship between the reference local image extraction numbers and the defensive rates, and take the target reference local image extraction number as a target number.

In some embodiments, the target number obtaining module is further configured to acquire resource information corresponding to a current device, and determine a current local image extraction number based on the resource information corresponding to the current device; take the current local image extraction number as the target number in a case that the reference local image extraction number exceeds the current local image extraction number; and take the reference local image extraction number as the target number in a case that the reference local image extraction number does not exceed the current local image extraction number.

Figure 16:
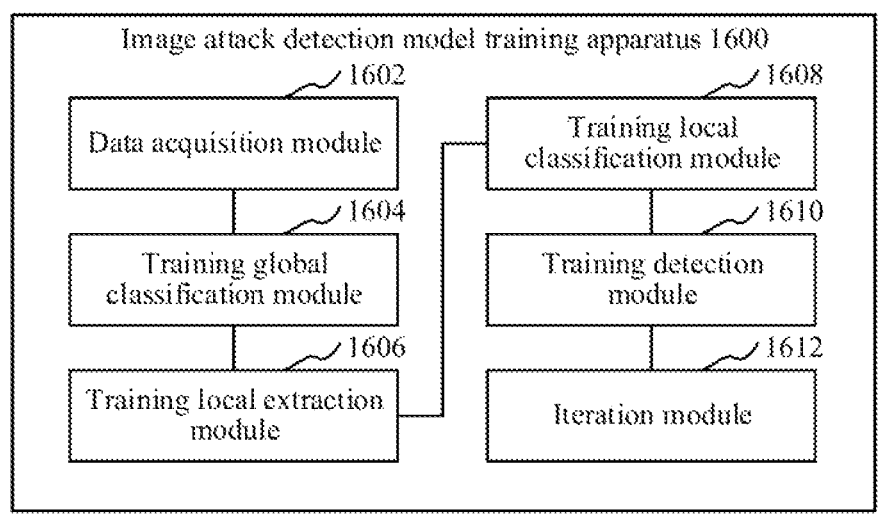
FIG. 16 is a structural block diagram of an image attack detection model training apparatus according to some embodiments.

In some embodiments, as shown in FIG. 16, an image attack detection model training apparatus 1600 is provided. The apparatus may be a part of a computer device using a software module or a hardware module or a combination of both. The apparatus specifically includes: a data acquisition module 1602, a training global classification module 1604, a training local extraction module 1606, a training local classification module 1608, a training detection module 1610, and an iteration module 1612.

The data acquisition module 1602 is configured to acquire training data. The training data includes a training image and an image attack category label.

The training global classification module 1604 is configured to input the training image into a global image classification recognition model for global classification recognition to obtain a training global classification recognition result vector.

The training local extraction module 1606 is configured to perform local image extraction randomly based on the training image to obtain a training target number of training local images. The training target number is obtained by calculating a defensive rate of a training reference image corresponding to the training image, and the defensive rate of the training reference image is used for characterizing a defense level of the training reference image being attacked by an image.

The training local classification module 1608 is configured to input the target number of training local images into a local image classification recognition model for local classification recognition respectively to obtain respective training local classification recognition result vectors, and fuse the respective training local classification recognition result vectors to obtain a target training classification recognition result vector.

The training detection module 1610 is configured to input the target training classification recognition result vector and the training global classification recognition result vector into an initial image attack detection model for consistency detection of recognition results to obtain an initial consistency detection result.

The iteration module 1612 is configured to update the initial image attack detection model based on the initial consistency detection result and the image attack category label, re-perform the operation of inputting the target training classification recognition result vector and the training global classification recognition result vector into an initial image attack detection model for consistency detection of recognition results to obtain an initial consistency detection result, and obtain a target image attack detection model upon the training completion.

In some embodiments, the image attack detection model training apparatus 1600 further includes:
a training size acquisition module, configured to acquire a training global size of the training image, and acquire a training reference image based on the training global size of the training image, the training reference image containing a preset training reference attack region, and the training reference attack region being determined according to a preset training attack region upper limit size;
a training parameter calculation module, configured to perform parameter calculation based on the training global size and the preset training attack region upper limit size to obtain a proportion parameter of a training target local image, an image content of the training reference attack region being present in the training target local image;
a training reference local extraction module, configured to acquire a training reference local image extraction number, and randomly performing local image extraction on the training reference image based on the training reference local image extraction number to obtain local images of the training reference local image extraction number;
a training lower limit number calculation module, configured to perform local classification recognition based on the local images of the training reference local image extraction number to obtain local classification recognition results of the training reference local image extraction number, and perform statistical calculation based on the local classification recognition results of the training reference local image extraction number to obtain an extraction lower limit number of the training target local image;
a training defensive rate calculation module, configured to perform binomial distribution summation calculation based on the extraction lower limit number of the training target local image, the training reference local image extraction number and the proportion parameter of the training target local image to obtain a defensive rate corresponding to the training reference image; and
a training target number obtaining module, configured to take the training reference local image extraction number as the training target number in a case that the defensive rate corresponding to the training reference image satisfies a preset condition.

In some embodiments, the training parameter calculation module is further configured to determine a training local size based on the training global size, and calculate a total number of training local images extractable from the training reference image based on the training global size and the training local size; calculate a total number of training target local images extractable from the training reference image based on the training global size, the training local size and the preset training attack region upper limit size; and calculate a ratio of the total number of training target local images to the total number of training local images to obtain a proportion parameter of the training target local image.

In some embodiments, the training lower limit number calculation module is further configured to calculate the number of first training categories and the number of second training categories in the local classification recognition results of the training reference local image extraction number, the first training categories referring to maximum categories in the local classification recognition results of the training reference local image extraction number, and the second training categories referring to maximum categories except for the first training categories in the local classification recognition results of the training reference local image extraction number; and calculate an extraction lower limit number of the training target local image based on the number of first training categories and the number of second training categories.

In some embodiments, the training reference local extraction module is further configured to acquire importance degrees of respective regions in the training image, and perform binary division on the training image according to a preset importance threshold based on the importance degrees of the respective regions to obtain a target region and a non-target region; select a first partial local image from the target region randomly, and select a second partial local image from the non-target region randomly, the area of the first partial local image being greater than the area of the second partial local image; and obtain a training local image based on the first partial local image and the second partial local image.

In some embodiments, the image attack detection model training apparatus 1600 further includes:
  a global recognition model training module, configured to acquire global training data, the global training data including a global training image and a corresponding global category label; input the global training image into an initial global image classification recognition model for global image classification recognition to obtain an initial global classification recognition result; perform loss calculation based on the initial global classification recognition result and the global category label to obtain global loss information; update parameters in the initial global image classification recognition model reversely based on the global loss information to obtain an updated global image classification recognition model; and take the updated global image classification recognition model as an initial global image classification recognition model, re-perform the operation of inputting the global training image into an initial global image classification recognition model for global image classification recognition to obtain an initial global classification recognition result until a global training completion condition is satisfied, and take the initial global image classification recognition model satisfying the global training completion condition as the global image classification recognition model.

In some embodiments, the global recognition model training module is further configured to acquire a current learning rate; and update parameters of the initial global image classification recognition model reversely based on the current learning rate and the global loss information to obtain an updated global image classification recognition model.

In some embodiments, the global recognition model training module is further configured to acquire a historical learning rate, and adjust the historical learning rate using a preset cosine function to obtain a current learning rate.

In some embodiments, the image attack detection model training apparatus 1600 further includes:
  a local recognition model training module, configured to take the global image classification recognition model as an initial local image classification recognition model; acquire local training data, the local training data including a local training image and a corresponding local image category label; input the local training image into the initial local image classification recognition model for local classification recognition to obtain an initial local classification recognition result; perform loss calculation based on the initial local classification recognition result and the local image category label to obtain local loss information, and reversely update the initial local image classification recognition model based on the local loss information to obtain an updated local image classification recognition model; and take the updated local image classification recognition model as an initial local image classification recognition model, re-perform the operation of inputting the local training image into the initial local image classification recognition model for local classification recognition to obtain an initial local classification recognition result until a local training completion condition is satisfied, and take the initial local image classification recognition model satisfying the local training completion condition as the local image classification recognition model.

The image attack detection apparatus and the image attack detection model training apparatus may be specifically limited with reference to the above limitations of the image attack detection method and the image attack detection model training method, and will not be described in detail herein. The modules in the foregoing image attack detection apparatus and the image attack detection model training apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to the foregoing modules.

In some embodiments, a computer device is provided. The computer device may be a server, and an internal structure diagram thereof may be shown in FIG. 17. The computer device includes a processor, a memory, and a network interface that are connected by using a system bus. The processor of the computer device is configured to provide computing and control capabilities. The memory of the computer device includes a non-volatile storage medium and an internal memory. The non-volatile storage medium stores an operating system, computer-readable instructions and a database. The internal memory provides an environment for running of the operating system and the computer-readable instructions in the non-volatile storage medium. The database of the computer device is used for the image-to-be-detected or for storing training data. The network interface of the terminal is configured to communicate with an external terminal through a network connection. The computer-readable instructions are executed by the processor to implement the image attack detection method and the image attack detection model training method.

In some embodiments, a computer device is provided. The computer device may be a terminal, and an internal structure diagram thereof may be shown in FIG. 18. The computer device includes a processor, a memory, and a communication interface, a display screen, and an input apparatus that are connected by using a system bus. The processor of the computer device is configured to provide computing and control capabilities. The memory of the computer device includes a non-volatile storage medium and an internal memory. The non-volatile storage medium stores an operating system and computer-readable instructions. The internal memory provides an environment for running of the operating system and the computer-readable instructions in the non-volatile storage medium. The communication interface of the computer device is configured to communicate with an external terminal in a wired or wireless mode. The wireless mode may be implemented through WIFI, operator network, NFC (near field communication) or other technologies. The computer-readable instructions are executed by the processor to implement the image attack detection method and the image attack detection model training method. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 17:
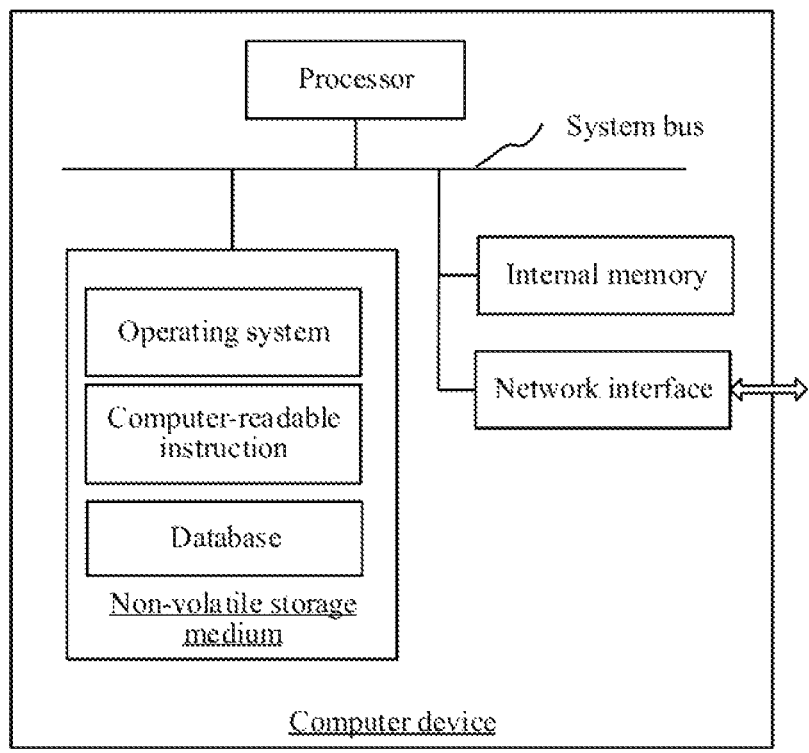
FIG. 17 is a diagram of an internal structure of a computer device according to some embodiments.
Figure 18:
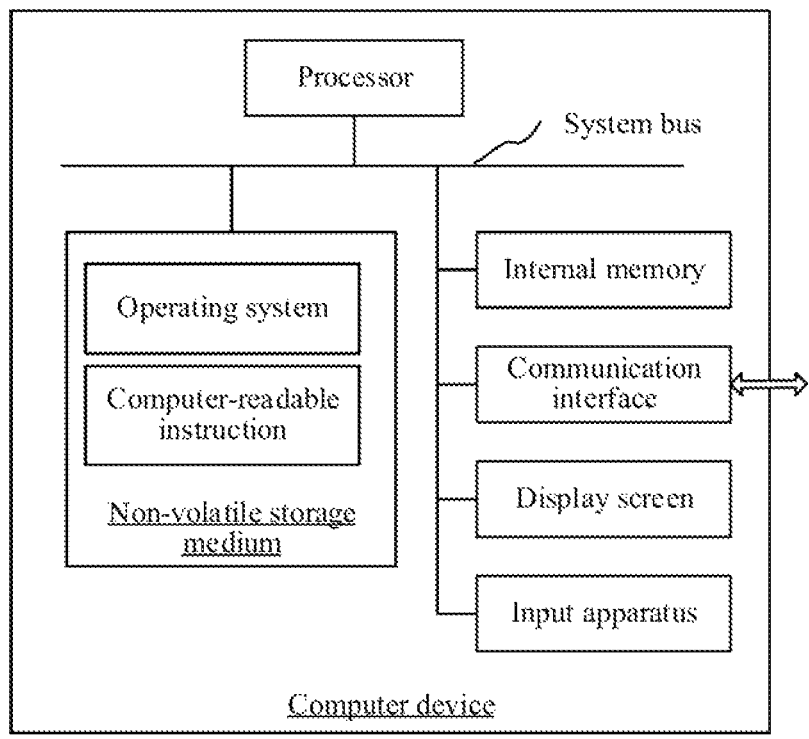
FIG. 18 is a diagram of an internal structure of a computer device according to some embodiments.

A person skilled in the art may understand that the structure shown in FIG. 17 and FIG. 18 is merely a block diagram of a part of the structure related to the solution of some embodiments, and does not constitute a limitation on a computer device thereto. In particular, the computer device may include more or fewer components than those shown in the figure, or some components may be combined, or a different component deployment may be used.

In some embodiments, a computer device is further provided, including a memory and a processor, the memory storing computer-readable instructions, the processor, when executing the computer-readable instructions, implementing the operations in the foregoing method embodiments.

In some embodiments, a computer-readable storage medium is provided, storing computer-readable instructions, the computer-readable instructions, when executed by a processor, implementing the operations in the foregoing method embodiments.

In some embodiments, a computer program product or a computer program is provided, including computer instructions, the computer instructions being stored in a computer-readable storage medium. A processor of the computer device reads the computer instructions from the computer-readable storage medium, and executes the computer instructions, causing the computer device to perform the operations in the foregoing method embodiments.

A person of ordinary skill in the art may understand that all or some of the procedures of the methods of the foregoing embodiments may be implemented by computer program instructing relevant hardware. The computer-readable instructions may be stored in a non-volatile computer-readable storage medium. When the computer-readable instructions are executed, the procedures of the embodiments of the foregoing methods may be included. Any reference to a memory, a storage, a database, or another medium used in the embodiments provided in some embodiments may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure.

What is claimed is:

1. An image attack detection method, performed by a computer device, the image attack detection method comprising:
   acquiring an image-to-be-detected, and performing global classification recognition based on the image-to-be-detected to obtain a global classification recognition result;
   performing local image extraction randomly based on the image-to-be-detected to obtain a target number of local images, the target number being obtained by calculation according to a defensive rate of a reference image corresponding to the image-to-be-detected, and the defensive rate of the reference image being used for characterizing a defense level of the reference image being attacked by an image;
   performing local classification recognition based on the target number of local images respectively to obtain respective local classification recognition results, and fusing the respective local classification recognition results to obtain a target classification recognition result; and
   detecting a similarity between the target classification recognition result and the global classification recognition result, and determining the image-to-be-detected as an attack image when the target classification recognition result and the global classification recognition result are dissimilar.

2. The image attack detection method according to claim 1, further comprising:
   inputting the image-to-be-detected into a global image classification recognition model for global classification recognition to obtain a global classification recognition result vector;
   performing local image extraction randomly based on the image-to-be-detected to obtain the target number of local images;
   inputting the target number of local images into a local image recognition model for local classification recognition respectively to obtain respective local classification recognition result vectors, and fusing the respective local classification recognition result vectors to obtain a target classification recognition result vector; and inputting the target classification recognition result vector and the global classification recognition result vector into an image attack detection model for similarity detection, and determining the image-to-be-detected as the attack image when the target classification recognition result and the global classification recognition result are dissimilar.

3. The image attack detection method according to claim 2, wherein the inputting the target classification recognition result vector and the global classification recognition result vector comprises:

concatenating the target classification recognition result vector and the global classification recognition result vector to obtain a concatenated vector; and inputting the concatenated vector to the image attack detection model, recognizing the similarity between the target classification recognition result vector and the global classification recognition result vector through the image attack detection model, determining the image-to-be-detected as a real image when the target classification recognition result and the global classification recognition result are similar, and determining the image-to-be-detected as the attack image when the target classification recognition result and the global classification recognition result are dissimilar.

4. The image attack detection method according to claim 2, wherein the fusing the respective local classification recognition result vectors comprises:

calculating an average vector of the respective local classification recognition result vectors to obtain the target classification recognition result vector.

5. The image attack detection method according to claim 1, further comprising:

acquiring a global size of the image-to-be-detected, and acquiring the reference image based on the global size of the image-to-be-detected, the reference image containing a reference attack region, the reference attack region being a preset reference attack region, and the reference attack region being determined according to a preset attack region upper limit size;

performing parameter calculation based on the global size and the preset attack region upper limit size to obtain a proportion parameter of a target local image, an image content of the reference attack region being present in the target local image;

acquiring a reference local image extraction number, and randomly performing local image extraction on the reference image based on the reference local image extraction number to obtain local images of the reference local image extraction number;

performing local classification recognition based on the local images of the reference local image extraction number to obtain local classification recognition results of the reference local image extraction number, and performing statistical calculation based on the local classification recognition results of the reference local image extraction number to obtain an extraction lower limit number of the target local image;

performing binomial distribution summation calculation based on the extraction lower limit number of the target local image, the reference local image extraction number and the proportion parameter of the target local image to obtain the defensive rate of the reference image; and taking the reference local image extraction number as the target number when the defensive rate of the reference image satisfies a preset condition.

6. The image attack detection method according to claim 5, wherein the performing parameter calculation comprises:

determining a local size based on the global size, and calculating a total number of local images extractable from the reference image based on the global size and the local size;

calculating a total number of target local images extractable from the reference image based on the global size, the local size and the preset attack region upper limit size; and calculating a ratio of the total number of target local images to the total number of local images to obtain the proportion parameter of the target local image.

7. The image attack detection method according to claim 5, wherein the performing statistical calculation comprises:

calculating a number of first categories and a number of second categories in the local classification recognition results of the reference local image extraction number, the first categories referring to maximum categories in the local classification recognition results of the reference local image extraction number, and the second categories referring to maximum categories except for the first categories in the local classification recognition results of the reference local image extraction number; and calculating the extraction lower limit number of the target local image based on the number of first categories and the number of second categories.

8. The image attack detection method according to claim 5, further comprising:

acquiring respective reference local image extraction numbers, obtaining corresponding respective defensive rates by calculating based on the respective reference local image extraction numbers, and establishing an association relationship between the reference local image extraction numbers and the defensive rates based on the respective reference local image extraction numbers and the corresponding respective defensive rates; and acquiring a preset defensive rate corresponding to the image-to-be-detected, searching for a target reference local image extraction number corresponding to the preset defensive rate from the association relationship between the reference local image extraction numbers and the defensive rates, and taking the target reference local image extraction number as the target number.

9. The image attack detection method according to claim 5, wherein the taking the reference local image extraction number as the target number comprises:

acquiring resource information corresponding to a current device, and determining a current local image extraction number based on the resource information corresponding to the current device;

taking the current local image extraction number as the target number when the reference local image extraction number exceeds the current local image extraction number; and taking the reference local image extraction number as the target number when the reference local image extraction number does not exceed the current local image extraction number.

10. An image attack detection apparatus comprising:

at least one memory configured to store program code; and at least one processor configured to read the program code and operate as instructed by the program code, the program code comprising:

global classification code configured to cause at least one of the at least one processor to acquire an image-to-be-detected, and perform global classification recognition based on the image-to-be-detected to obtain a global classification recognition result;

local extraction code configured to cause at least one of the at least one processor to perform local image extraction randomly based on the image-to-be-detected to obtain a target number of local images, the target number being obtained by calculation according to a defensive rate of a reference image corresponding to the image-to-be-detected, and the defensive rate of the reference image being used for characterizing a defense level of the reference image being attacked by an image;

local classification code configured to cause at least one of the at least one processor to perform local classification recognition based on the target number of local images respectively to obtain respective local classification recognition results, and fuse the respective local classification recognition results to obtain a target classification recognition result; and detection code configured to cause at least one of the at least one processor to detect a similarity between the target classification recognition result and the global classification recognition result, and determine the image-to-be-detected as an attack image when the target classification recognition result and the global classification recognition result are dissimilar.

11. The image attack detection apparatus according to claim 10, wherein the program code further comprises:

global model classification code configured to cause at least one of the at least one processor to input the image-to-be-detected into a global image classification recognition model for global classification recognition to obtain a global classification recognition result vector;

random extraction code configured to cause at least one of the at least one processor to perform local image extraction randomly based on the image-to-be-detected to obtain the target number of local images;

local model classification code configured to cause at least one of the at least one processor to input the target number of local images into a local image recognition model for local classification recognition respectively to obtain respective local classification recognition result vectors, and fuse the respective local classification recognition result vectors to obtain a target classification recognition result vector; and detection model detecting code configured to cause at least one of the at least one processor to inputting the target classification recognition result vector and the global classification recognition result vector into an image attack detection model for similarity detection, and determining the image-to-be-detected as the attack image when the target classification recognition result and the global classification recognition result are dissimilar.

12. The image attack detection apparatus according to claim 11, wherein the detected model detecting code is further configured to cause at least one of the at least one processor to:

concatenate the target classification recognition result vector and the global classification recognition result vector to obtain a concatenated vector; and input the concatenated vector to the image attack detection model, recognize the similarity between the target classification recognition result vector and the global classification recognition result vector through the image attack detection model, determine the image-to-be-detected as a real image when the target classification recognition result and the global classification recognition result are similar, and determine the image-to-be-detected as the attack image when the target classification recognition result and the global classification recognition result are dissimilar.

13. The image attack detection apparatus according to claim 11, wherein the local model classification code is further configured to cause at least one of the at least one processor to:

calculate an average vector of the respective local classification recognition result vectors to obtain the target classification recognition result vector.

14. The image attack detection apparatus according to claim 10, wherein the program code further comprises:

size acquisition code configured to cause at least one of the at least one processor to acquire a global size of the image-to-be-detected, and acquire the reference image based on the global size of the image-to-be-detected, the reference image containing a reference attack region, the reference attack region being a preset reference attack region, and the reference attack region being determined according to a preset attack region upper limit size;

parameter calculation code configured to cause at least one of the at least one processor to perform parameter calculation based on the global size and the preset attack region upper limit size to obtain a proportion parameter of a target local image, an image content of the reference attack region being present in the target local image;

reference local extraction code configured to cause at least one of the at least one processor to acquire a reference local image extraction number, and randomly perform local image extraction on the reference image based on the reference local image extraction number to obtain local images of the reference local image extraction number;

lower limit number calculation code configured to cause at least one of the at least one processor to perform local classification recognition based on the local images of the reference local image extraction number to obtain local classification recognition results of the reference local image extraction number, and perform statistical calculation based on the local classification recognition results of the reference local image extraction number to obtain an extraction lower limit number of the target local image;

defensive rate calculation code configured to cause at least one of the at least one processor to perform binomial distribution summation calculation based on the extraction lower limit number of the target local image, the reference local image extraction number and the proportion parameter of the target local image to obtain the defensive rate of the reference image; and target number obtaining code configured to cause at least one of the at least one processor to take the reference local image extraction number as the target number when the defensive rate of the reference image satisfies a preset condition.

15. The image attack detection apparatus according to claim 14, wherein the parameter calculation code is further configured to cause at least one of the at least one processor to:
   determine a local size based on the global size, and calculate a total number of local images extractable from the reference image based on the global size and the local size;
   calculate a total number of target local images extractable from the reference image based on the global size, the local size and the preset attack region upper limit size; and
   calculate a ratio of the total number of target local images to the total number of local images to obtain the proportion parameter of the target local image.

16. The image attack detection apparatus according to claim 14, wherein the lower limit number calculation code is further configured to cause at least one of the at least one processor to:
   calculate a number of first categories and a number of second categories in the local classification recognition results of the reference local image extraction number, the first categories referring to maximum categories in the local classification recognition results of the reference local image extraction number, and the second categories referring to maximum categories except for the first categories in the local classification recognition results of the reference local image extraction number; and
   calculate the extraction lower limit number of the target local image based on the number of first categories and the number of second categories.

17. The image attack detection apparatus according to claim 14, wherein the program code further comprises:
   relationship establishment code configured to cause at least one of the at least one processor to acquire respective reference local image extraction numbers, obtain corresponding respective defensive rates by calculating based on the respective reference local image extraction numbers, and establish an association relationship between the reference local image extraction numbers and the defensive rates based on the respective reference local image extraction numbers and the corresponding respective defensive rates; and
   search code configured to cause at least one of the at least one processor to acquire a preset defensive rate corresponding to the image-to-be-detected, search for a target reference local image extraction number corresponding to the preset defensive rate from the association relationship between the reference local image extraction numbers and the defensive rates, and take the target reference local image extraction number as the target number.

18. The image attack detection apparatus according to claim 14, wherein the target number obtaining code is further configured to cause at least one of the at least one processor to:
   acquire resource information corresponding to a current device, and determine a current local image extraction number based on the resource information corresponding to the current device;
   take the current local image extraction number as the target number when the reference local image extraction number exceeds the current local image extraction number; and
   take the reference local image extraction number as the target number when the reference local image extraction number does not exceed the current local image extraction number.

19. A non-transitory computer-readable storage medium, storing computer code that, when executed by at least one processor, causes the at least one processor to at least:
   acquire an image-to-be-detected, and performing global classification recognition based on the image-to-be-detected to obtain a global classification recognition result;
   perform local image extraction randomly based on the image-to-be-detected to obtain a target number of local images, the target number being obtained by calculation according to a defensive rate of a reference image corresponding to the image-to-be-detected, and the defensive rate of the reference image being used for characterizing a defense level of the reference image being attacked by an image;
   perform local classification recognition based on the target number of local images respectively to obtain respective local classification recognition results, and fuse the respective local classification recognition results to obtain a target classification recognition result; and
   detect a similarity between the target classification recognition result and the global classification recognition result, and determine the image-to-be-detected as an attack image when the target classification recognition result and the global classification recognition result are dissimilar.

20. The non-transitory computer-readable storage medium according to claim 19, wherein the computer code is further configured to, when executed by the at least one processor, cause the at least one processor to at least:
   input the image-to-be-detected into a global image classification recognition model for global classification recognition to obtain a global classification recognition result vector;
   perform local image extraction randomly based on the image-to-be-detected to obtain the target number of local images;
   input the target number of local images into a local image recognition model for local classification recognition respectively to obtain respective local classification recognition result vectors, and fuse the respective local classification recognition result vectors to obtain a target classification recognition result vector; and
   input the target classification recognition result vector and the global classification recognition result vector into an image attack detection model for similarity detection, and determine the image-to-be-detected as the attack image when the target classification recognition result and the global classification recognition result are dissimilar.

\* \* \* \* \*